(12) United States Patent
Sevindik

(10) Patent No.: US 12,063,601 B2
(45) Date of Patent: Aug. 13, 2024

(54) METHODS AND APPARATUS FOR REDUCING DOWNLINK TRANSMISSION POWER IN A WIRELESS SYSTEM

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 68 days.

(21) Appl. No.: 17/521,020

(22) Filed: Nov. 8, 2021

(65) Prior Publication Data

US 2023/0144939 A1     May 11, 2023

(51) Int. Cl.
    *H04W 52/36*     (2009.01)
    *H04W 52/02*     (2009.01)
    *H04W 52/24*     (2009.01)

(52) U.S. Cl.
    CPC ..... *H04W 52/362* (2013.01); *H04W 52/0206* (2013.01); *H04W 52/243* (2013.01)

(58) Field of Classification Search
    CPC ........... H04W 52/0206; H04W 52/143; H04W 52/362; H04W 52/243; H04W 52/146; H04W 52/346; H04W 52/367; Y02D 30/70
    See application file for complete search history.

(56) References Cited

U.S. PATENT DOCUMENTS

| | | | | |
|---|---|---|---|---|
| 2002/0002058 A1* | 1/2002 | Hamabe | | H04W 52/40 455/69 |
| 2008/0039128 A1* | 2/2008 | Ostman | | H04W 52/22 455/522 |
| 2008/0181184 A1* | 7/2008 | Kezys | | H04W 52/343 370/338 |
| 2011/0170466 A1* | 7/2011 | Kwun | | H04W 52/0235 370/311 |
| 2015/0173069 A1* | 6/2015 | Cucala Garcia | | H04W 72/27 370/329 |
| 2015/0282045 A1* | 10/2015 | Salem | | H04W 40/10 370/329 |
| 2016/0105853 A1* | 4/2016 | Zhao | | H04W 52/244 370/311 |
| 2017/0332396 A1* | 11/2017 | Liao | | H04L 27/26025 |
| 2020/0396621 A1* | 12/2020 | Park | | H04J 11/0056 |
| 2022/0007301 A1* | 1/2022 | Wigren | | H04W 52/267 |
| 2022/0346024 A1* | 10/2022 | Abotabl | | H04W 52/143 |

\* cited by examiner

*Primary Examiner* — Ricardo H Castaneyra
(74) *Attorney, Agent, or Firm* — Straub & Straub; Michael P. Straub; Stephen T. Straub

(57) ABSTRACT

Methods and apparatus for reducing base station downlink transmission power in a manner that provides one or more devices being serviced by the base station time to establish or switch to another connection are described. The methods and apparatus are particularly well suited for system where base stations may be instructed by a control device to reduce or stop downlink power to a point where downlink data transmission is not supportable. In various embodiments a base station responds to a downlink power reduction instruction by reducing downlink transmission power in downlink slots in a serious of power reduction steps. In cases where the required power reduction is to a point where downlink data transmission can not be supported, the base station signals that it is switching to a no DL slot mode of operation in which downlink slots are not supported but UL slots will continue to be supported.

20 Claims, 13 Drawing Sheets

METHODS AND APPARATUS FOR REDUCING DOWNLINK TRANSMISSION POWER IN A WIRELESS SYSTEM

The present application relates to wireless communications, and more specifically, to reducing base station downlink transmission power, e.g., in response to a power reduction command from a control device.

BACKGROUND

In various systems base stations may be subject to transmission power restrictions with another device in the system determining when a particular base station must reduce its transmission power or stop transmitting on some or all frequencies the base station is using due to interference concerns. This is particularly the case where incumbent device may have communications priority over other devices.

A Citizens Broadband Radio Service (CBRS) is one type of system in which a base station, e.g., a Citizens Broadband radio Service Device (CBSD), may be, and sometimes is, ordered to reduce transmission power, e.g., to stop DL data transmissions. In a CBRS system a Spectrum Access System (SAS) is responsible for managing interference between devices. A SAS grants spectrum to CBSDs in the CBRS network, e.g., a network which uses 3.5 GHz spectrum. In some such systems a TDD version of the 5G is used in 3.5 GHz. If the interference in the granted spectrum increases, it is expected that the SAS will instruct a CBSD which is a source of interference to reduce its downlink transmission power, e.g., by sending a power down command to the CBSD. In some cases, the power down command may require the CBSD to reduce power to the point where downlink data transmission to devices can no longer be supported.

When CBSD power is reduced, the power impact will be a function of the frame configuration/timing structure in use by the CBSD instructed to power down. It is desirable that power down instructions be implemented in a graceful manner so that devices being serviced by a CBSD are not cut off immediately despite the CBSD having to implement the power down command.

Regardless of the of the particular frame structure in use at the time a base station, e.g., CBSD, is instructed to power down, it would be desirable if service was not immediately cut off and one or more wireless devices were allowed some time to complete a communications session and/or find another network or device to connect to. While not necessary for all embodiments, it would be desirable if in at least some embodiment devices receiving service from a CBSD were provided with reduced downlink service for some period of time before being forced to use another device, e.g., base station, as the connection point for data supplied to the wireless device. In addition, it is desirable that in at least some embodiments a wireless device might be able to continue to use a CBSD subject to downlink transmission constraints for uplink signaling for at least some time after which downlink data transmission is no longer supported by the CBSD.

SUMMARY

Methods and apparatus for reducing base station downlink transmission power in a manner that provides one or more devices being serviced by the base station time to establish or switch to another connection are described. The methods and apparatus are particularly well suited for systems, e.g., CBRS networks, where base stations such as CBSDs, may be instructed by a control device, e.g., SAS, to reduce or stop downlink power to a point where downlink data transmission are not supportable or supported.

In various embodiments a base station, e.g., CBSD, responds to a downlink power reduction instruction, e.g., command from an SAS requiring a reduction in overall, e.g., average, downlink transmission power, by reducing downlink transmission power in downlink frames in a serious of power reduction steps. In cases where the required power reduction is to a point where downlink data transmission can not be supported, the base station signals that it is switching to an uplink frame mode of operation in which downlink frames are not supported until the base station sends an indication that downlink frames are once again supported.

In some, but not necessarily all, embodiments the power reduction to be implemented is achieved over a period of several minutes with the base station reducing the original downlink power in steps. The power reduction may be, and sometimes is, implemented in fixed step sizes with the reduction from the original power level being implemented in several steps, e.g., 4, 5 or 16 steps in some embodiments. A 4 step reduction in DL transmission power corresponds to a 25% reduction in overall DL transmission power per step which a 5 step reduction in DL transmission power corresponds to a 20% per step reduction in transmission power based on the transmission power level at the time the command was received.

The overall downlink transmission power reduction is achieved in some embodiments by reducing the transmission power per frame and/or by allowing some frames to go unused. Which DL frames are allowed to go unused, in embodiments where at least some frames are left unused, is determined in some embodiments randomly or pseudo randomly. The random or pseudo random selection of which downlink slots go unused reduces the risk that during a power measurement interval a control device such as SAS will measure a power level that would correspond to full use of all available downlink transmission slots. The random selection of which DL slots go unused can also spread out the impact of the DL data transmission reductions on devices since different devices may be using different DL transmission slots.

In some embodiments when reducing power or changing the frame structure the base station will be using, as part of the power reduction process, the base station signals, e.g., announces, the upcoming change or changes to devices, e.g., stations (STAs) or user equipment devices (UEs) it is serving. The change information is transmitted in some embodiments in a flexible frame in the timing structure being used. Following the indication of the change the base station switches to the reduced power level and/or new frame timing structure. The power reduction announcement puts devices which were receiving downlink service from the base station on notice that they should take steps to compensate for the reduction in downlink transmission power, e.g., by increasing the number of antennas being used to receive signals if possible, and/or to put the devices on notice that they should start looking for other connections as downlink reliability and/or availability will be reduced due to the reduction in downlink transmission power being implemented.

After each step size reduction in downlink transmission power level being used the base station operates for multiple frame times at the new reduced power level, e.g., for more than a minute but in several embodiments for multiple minutes. This provides devices the opportunity to continue operating for some time and is likely to encourage at least some devices to switch to another base station while giving them some time to make the switch. As the power level is reduced with each step size reduction in power the number of devices deciding to switch is likely to increase. In this way, in at least some embodiments, neighboring base stations are not overwhelmed by all the devices being serviced by the base station being dropped at once allowing for a more graceful sequence of handover of devices than might otherwise be possible.

In some embodiments as the amount of downlink transmission power used in a period of time is reduced to the point where a number of downlink slots are being intentionally left unused, the base station may, and sometimes does, signal a switch from a downlink dominant frame timing structure to an uplink dominant frame timing structure. Thus, as the base station reduces the number of slots being used for downlink transmissions for power reduction reasons, some or all of the unused slots can start being used for uplink transmissions. Such a change is particularly well suited in CBRS systems where the SAS controls transmission power of CBSD devices but UE devices/STAs are not subject to SAS transmission power control.

When a base station is going to switch to zero downlink transmission power for downlink data transmissions, it signals that the timing structure used by the base station is being switched to a timing structure which does not include downlink slots. This information can be and sometimes is communicated in a flexible frame. The frame in which devices are notified that DL data transmission slots are not being supported going forward until further notice from the base station is sometimes referred to a freeze frame since the operation is frozen in a mode in which downlink slots are not present until further notice.

Depending on the embodiment, after the switch to zero downlink transmission power for downlink data slots, in some but not necessarily all embodiments, the timing structure will include uplink slots only or a combination of uplink and flexible slots. Such slots are well suited for devices which predominately send uplink traffic, e.g., meters, sensors or other devices which frequently report information, but which do not require or rarely require the use of downlink slots for the communication of data to the devices.

Thus, in some embodiments UEs and STAs will be able to continue to perform uplink transmissions after downlink slots are eliminated from the timing structure being used with the number of uplink slots available for use being increased since uplink slots will replace the downlink slots that were previously in use prior to the change to the mode of operation where downlink slots are not supported.

In various embodiments, while the base station may be precluded from transmitting power in downlink slots, it may be, and sometimes is, allowed to transmit a small amount of power for timing and/or other control signals. In this way devices using uplink slots can continue to maintain timing synchronization with the base station.

A base station can signal support for downlink slots in a message sent in a flexible slot or via another control signal. Receipt of a signal indicating use of a timing structure which includes downlink transmission slots will trigger UEs and/or other devices to switch to the indicated timing structure. Thus, after a period of time, e.g., several minutes, hours, or days, the base station that switched to the no downlink slots mode of operation may signal to devices that it is once again supporting downlink mode of operation. The announcement may simply be in the form of a base station signal indicating the timing structure to be used going forward with the indicated timing structure including downlink slots.

All of the features discussed in the above summary are not included in all embodiments and it should be appreciated that various embodiments include different combinations of features.

Numerous features and variations on the above described methods and apparatus are possible. Various embodiments, features and variations are described in more detail in the detailed description which follows.

The detailed description which follows describes additional features, details and embodiments which can be used alone or in combination.

BRIEF DESCRIPTION OF THE FIGURES

FIGS. 6A, 6B, 6C and 6D are to be combined to form a complete flow chart showing the steps of an exemplary method implemented by a base station in accordance with one exemplary embodiment.

DETAILED DESCRIPTION

Figure 1:
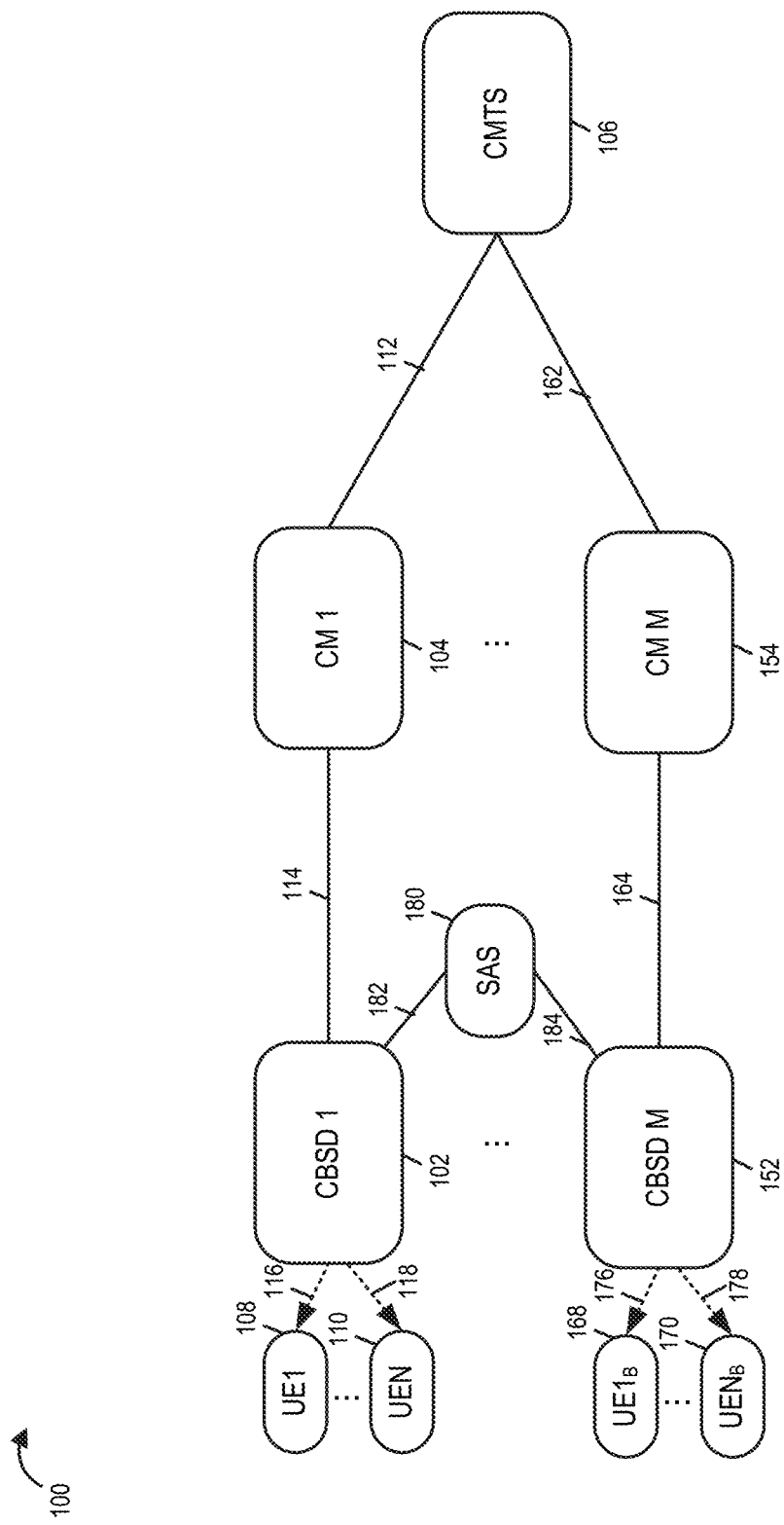
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a plurality of base stations (Citizens Broadband Radio Services Device 1 (CBSD 1) 102, . . . , CBSD M 152), a plurality of cable modems (cable modem 1 (CM1) 104, . . . , CM M 154), a cable modem termination system (CMTS) 106, a spectrum access system (SAS) 180, and a plurality of user equipment devices (UE 1 108, . . . , UE N 110, UE 1B 168, . . . UENB 170) coupled together as shown. CMTS 106 is coupled to CM1 104 and CM M 154, via communications links (112, 162), respectively. Communication links (112, . . . , 162) are, e.g., cables, e.g. coaxial cables or fiber optic cables. CM 1 104 is coupled to CBSD 1 102 via communications link 114. CM M 154 is coupled to CBSD M 152 via communications link 164. SAS 180 is coupled to CBSD 1 102 and CBSD M 152 via communications links 182, 184, respectively. CBSD 1 102 is coupled to UE 1 108 and UE N 110 via wireless communications links 116, 118, respectively. CBSD M 152 is coupled to UE 1B 168 and UE NB 170 via wireless communications links 176, 178, respectively. In some embodiments, the cable modems (CM 1 104, . . . , CM M 154) are Data Over Cable Service Interface Specification (DOCSIS) cable modems.

As will be discussed below, in some embodiments the SAS 180 will detect an unacceptable level of interference, e.g., to an incumbent device, and send a power down command to one or more of the base stations, e.g., CBSDs 102 and/or 152. In response to the received power down command, in various embodiments, the CBSD 102 and/or 152 will take steps to reduce downlink transmission power. In various embodiments overall downlink transmission power reduction occurs in a serious of steps, e.g., with each step corresponding to a reduction from the overall, e.g., average, amount of downlink transmission power transmission power that was being used at the time the power down command was received. At the end of implementation of the power down command the base station may, and in some embodiments will, send a notification to devices it was providing service to indicating that the base station is switching to a mode of operation in the timing structure used that does not include slots for downlink frames, e.g., that a switch to a timing structure including uplink frames and no downlink frames is being implemented. In some embodiments the timing structure may also include flexible frames. The notification of the switch to using a timing structure without downlink frames is sometimes referred to as a freeze frame notification and may be, and sometimes is, transmitted in a flexible frame.

Figure 2:
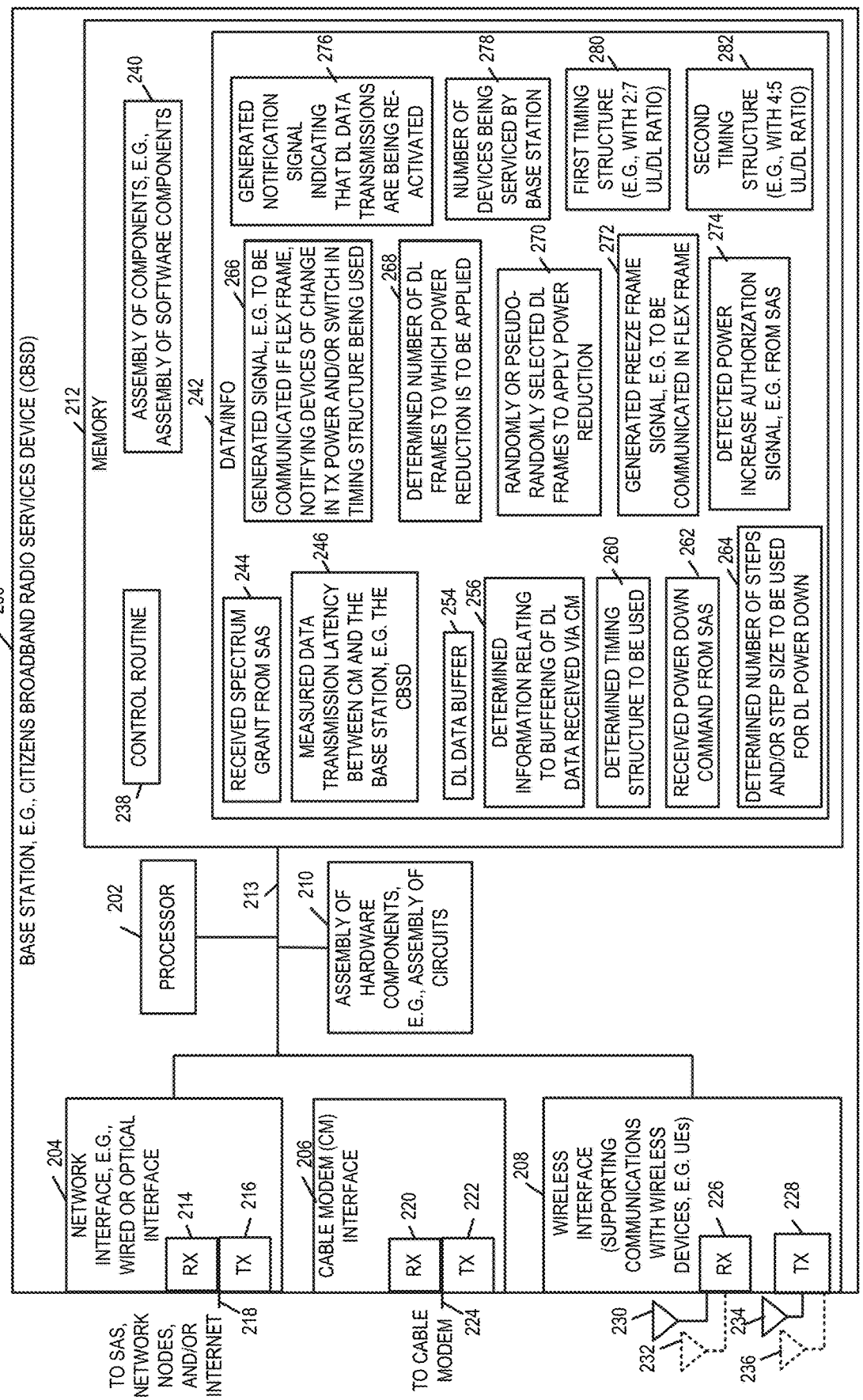
FIG. 2 is a drawing of an exemplary base station, e.g., a Citizens Broadband Radio Services Device (CBSD), in accordance with an exemplary embodiment.
Figure 6A:
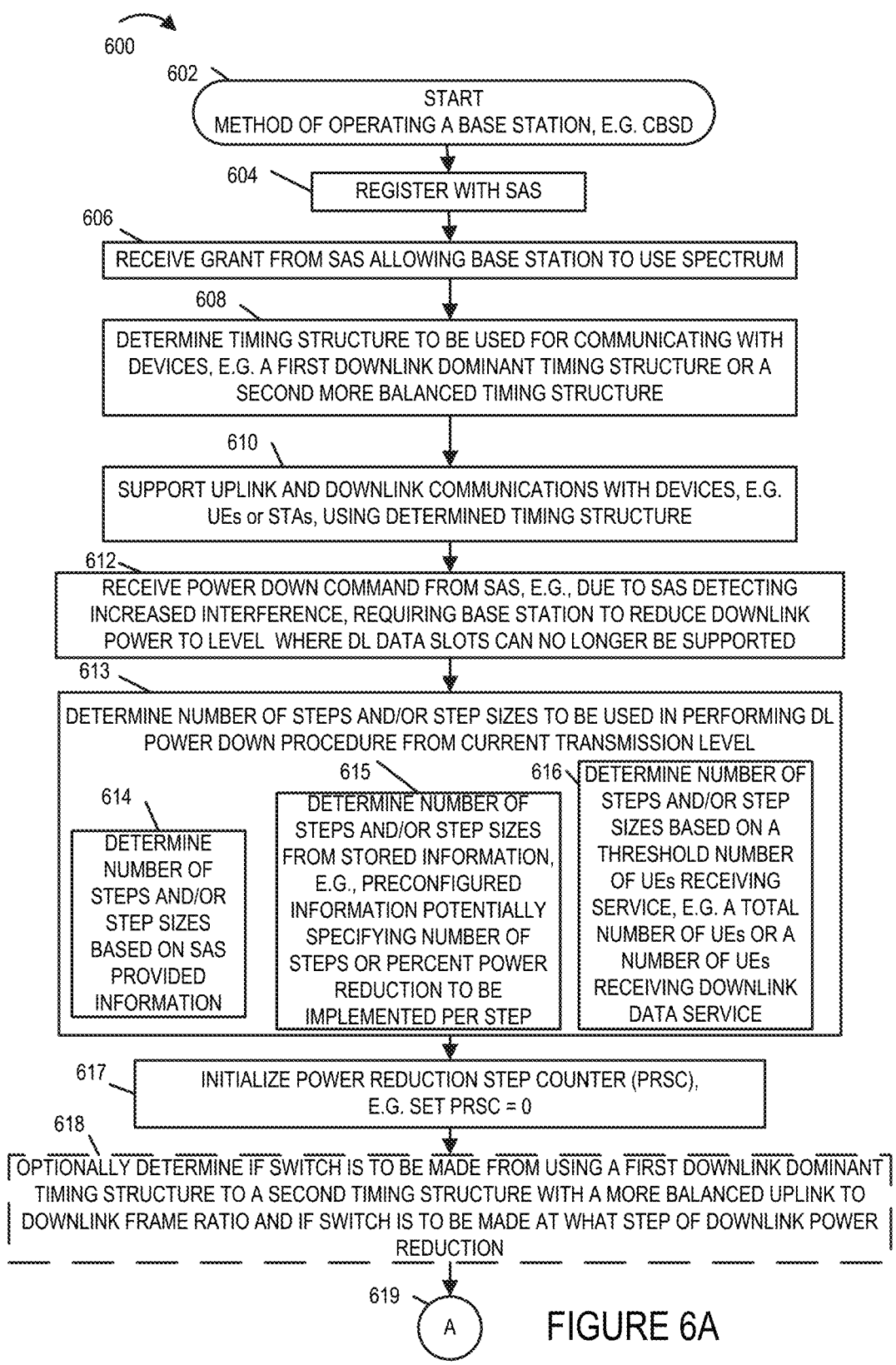
FIG. 6A is a first part of a flow chart showing steps performed by a base station in accordance with one exemplary method.
Figure 6B:
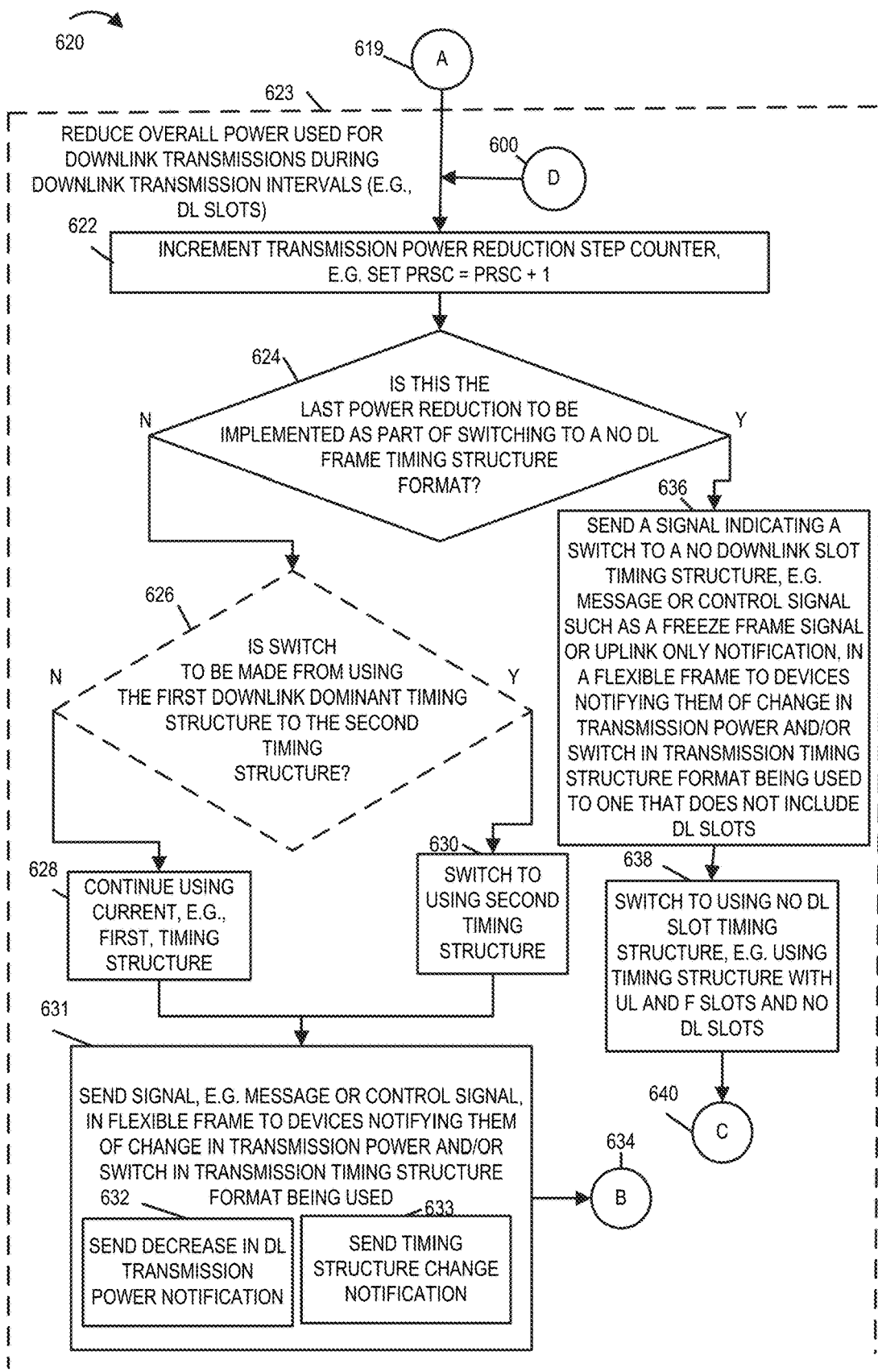
FIG. 6B is a second part of a flow chart showing steps performed by a base station in accordance with one exemplary method.
Figure 6C:
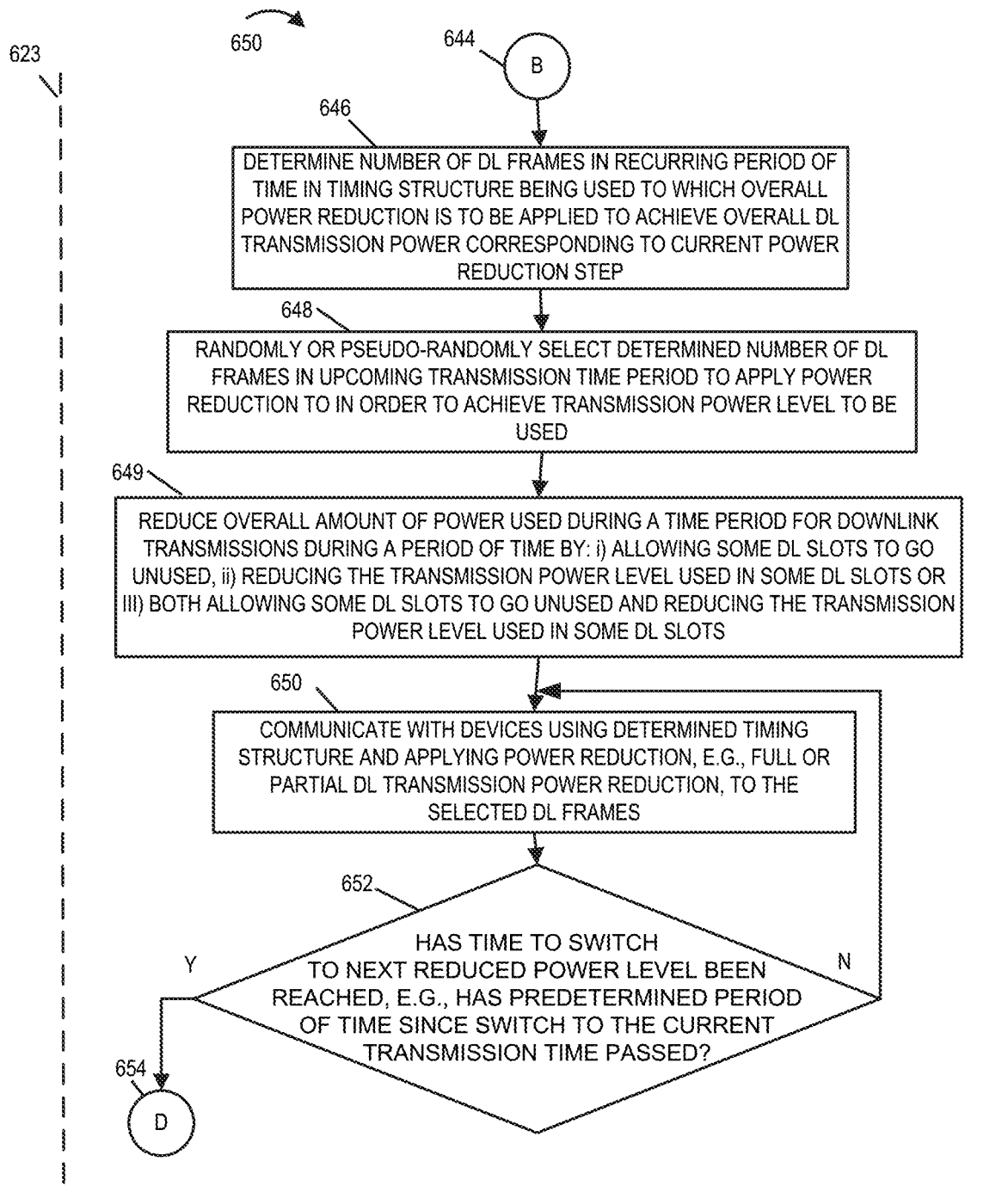
FIG. 6C is a third part of a flow chart showing steps performed by a base station in accordance with one exemplary method.
Figure 6D:
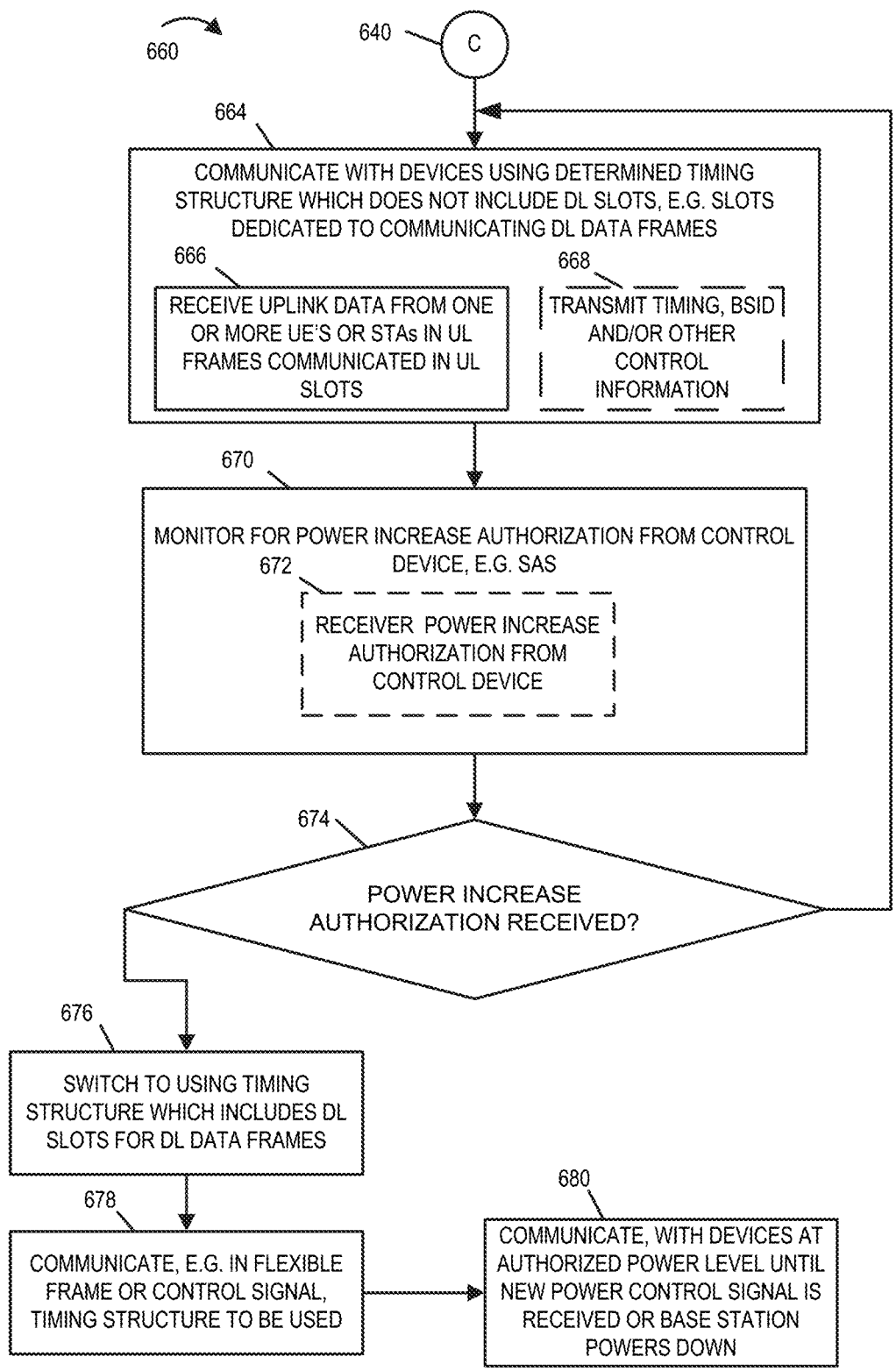
FIG. 6D is a fourth part of a flow chart showing steps performed by a base station in accordance with one exemplary method.
Figure 6:
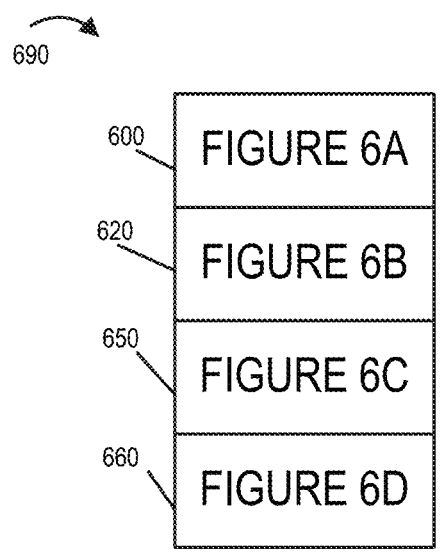
FIG. 6 is a diagram showing how

FIG. 2 is a drawing of an exemplary base station 200, e.g. a Citizens Broadband Radio Services Device (CBSD), in accordance with an exemplary embodiment, which can be used as any one of the base stations 102, 152 shown in FIG. 1 and/or a base station implementing the method of flowchart 600 of FIG. 6.

Exemplary base station 200 includes a processor 202, e.g. a CPU, a network interface 204, e.g., a wired of optical interface, a cable modem (CM) interface 206, a wireless interface 208, an assembly of hardware components 210, e.g. assembly of circuits, and memory 212, coupled together via a bus 213 over which the various elements may interchange data and information.

Network interface 204 includes a receiver 214 and a transmitter 216. Receiver 214 and transmitter 216 are coupled to connector 218, via which the base station is coupled to a SAS 180, networks nodes and/or the Internet. Cable modem interface 206 includes a receiver 220 and transmitter 222. Receiver 220 and transmitter 222 are coupled to connector 224, via which the base station 200 is coupled via a cable connection, e.g., a fiber optic or coaxial cable, to a cable modem, e.g., a DOCSIS CM. Wireless interface 208 supports communications with wireless devices, e.g. user equipment (UE) devices also sometimes referred to as stations (STAs). Wireless interface 208 includes a wireless receiver 226 and a wireless transmitter 228. Wireless receiver 226 is coupled to one or more receive antennas (receive antenna 1 230, . . . , receive antenna N 232) via which the base station 200 receives uplink signals from one or more wireless devices. Wireless transmitter 228 is coupled to one or more transmit antennas (transmit antenna 1 234, . . . , transmit antenna N 236) via which the base station 200 transmits downlink signals to one or more wireless devices.

Memory 212 includes a control routine 238 for controlling basic operations of the base station, e.g., initialization, CPU control, memory load, memory read, interfaces settings and control, downlink transmission power control, selection of which UL/DL schedule to use at a given time, etc., an assembly of components 240, e.g., an assembly of software components, and data/information 242. In some embodiments, the assembly of components 240 includes software modules, routines, and/or applications for performing one of more steps of an exemplary method, e.g., steps of the methods of flowchart 600 of FIG. 6 which are performed by a base station, e.g., a CBSD.

Data information 242 includes a received spectrum grant 244 from a SAS, measured data transmission latency 246 between CM and the base station, e.g., the CBSD, a downlink data buffer 254, and determined information 256. The determined information 356 relating to buffering DL data received via the CM. Data/information 242 further includes a received power down command from the SAS 262, a determined number of steps and/r step size to be used for DL power down 264, a generated signal, e.g. to be communicated in a flexible frame, notifying devise of a change in DL transmission power and/or a switch in timing structure being used 266, a determined number of DL frames to which a determined power reduction is to applied 268, information identifying randomly or pseudo-randomly selected DL frames to apply power reduction 270, a generated freeze frame signal, e.g., to be communicated in a flexible frame 272, a detected power increase authorization signal 274, e.g. from the SAS, a generated notification signal indicating that DL data transmissions are being re-activated 276, a number of devices being serviced by the base station 278, a first timing structure (e.g., with a 2:7 UL/DL ratio) 280, and a second timing structure (e.g., with a 4:5 UL/DL ratio) 282.

Figure 3:
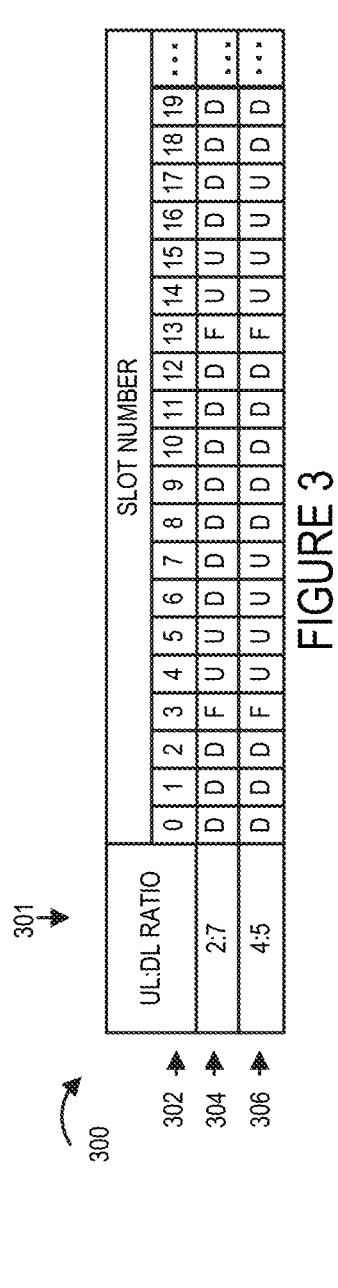
FIG. 3 illustrates two different timing structures supporting different uplink slot to downlink slot ratios that can be, and sometimes are, used by a base station, such as the base station shown in FIG. 2, at different times.

FIG. 3 shows a chart 300 illustrating two different timings structures that can be, and sometimes are, used by a base station 102 or 152. The first column 301 shows the UL/DL slot ratio in the timing structure corresponding to the horizontal row. Row 302 shows the number of the slots in the timing structure listed below row 302. Note that the series of dots, . . . , indicates that the pattern of slots can repeated and continue as the base station operates, e.g., for minutes or days.

Row 304 shows a first timing structure, i.e., slot pattern, which includes downlink slots indicated by a D, flexible slots indicated by an F, and uplink slots indicated by a U. The ratio of uplink to downlink slots for the first pattern 304 is 2:7. An uplink frame can be transmitted in an uplink slot while a downlink frame can be transmitted in a downlink slot. Downlink frames are normally used to transmit data from the base station to a device receiving service from the base station. This first timing structure including a slot pattern that includes a high number of downlink slots relative to uplink slots is well suited where downlink data traffic dominates the traffic being supported by the base station supports more downlink traffic than uplink traffic.

The last row 306 of FIG. 3 shows a second timing structure, i.e., slot pattern, which includes downlink slots indicated by a D, flexible slots indicated by an F, and uplink slots indicated by a U. The ratio of uplink to downlink slots for the second pattern 306 is 4:5. The second timing structure 306 is well suited when uplink and downlink loads on a base station are similar or nearly equal. Depending on the embodiment, at a given time the base station may use either timing structure 304 or timing structure 306 with UE devices being informed or detecting what timing structure is to be used based on signals transmitted by the base station.

Figure 4:
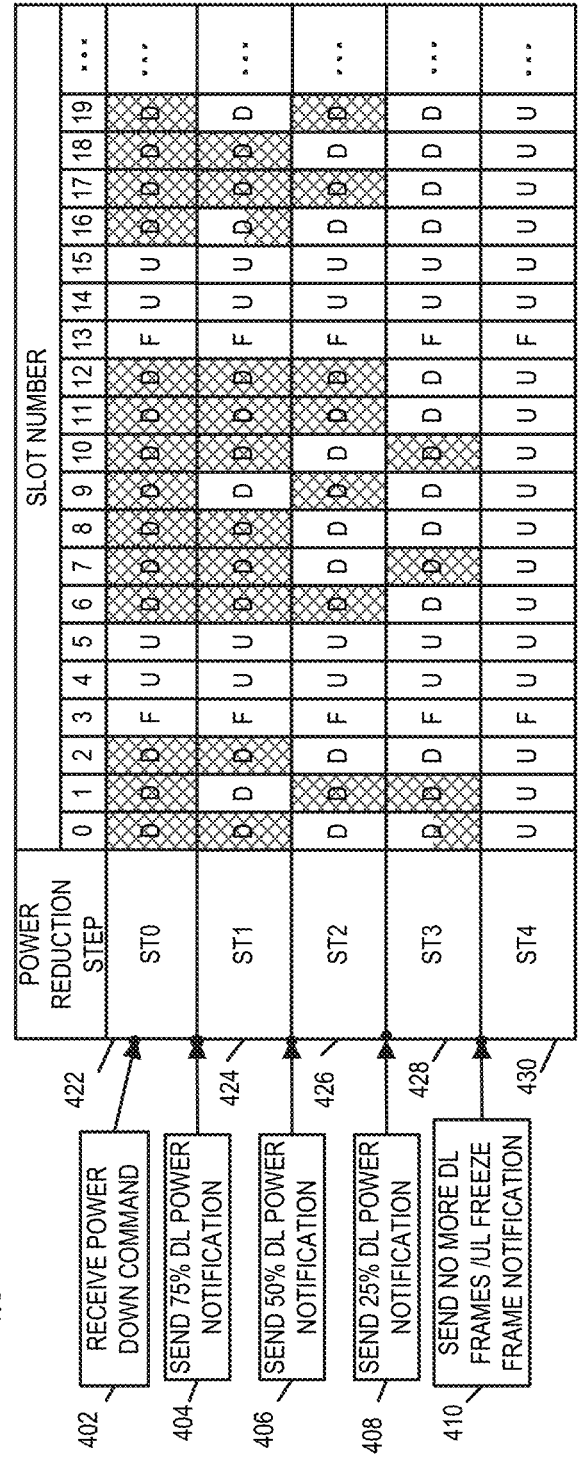
FIG. 4 illustrates a first sequence of power reduction steps and a corresponding pattern of uplink and downlink slots with overall downlink transmission power being reduced in the illustrated sequence of power reduction steps.

FIG. 4 is a diagram 400 illustrating a first sequence of power reduction steps 420 and a corresponding pattern of uplink and downlink slots. Overall downlink transmission power is reduced in the illustrated sequence of power reduction steps. In the example shown in diagram 400 of FIG. 4 a power down command is received by a base station, e.g., CBSD 102 in step 402 from an SAS. This occurs in step ST0 which in which the base station 102 is operating at a normal overall downlink transmission power level. The dot is used to indicate where the reception of the command occurs, i.e., during the normal operation indicated as ST0. Note that during the first step, ST0, the base station 102 is operating using the first timing schedule, e.g., sequence shown in FIG. 3. Thus during the time interval in which the power down command is received, the base station 102 is operating at a normal downlink power level as represented by the shading in the downlink slots D of the first row 422 of the chart shown in FIG. 4 being fully shaded to represent that they are used at a normal or full overall downlink transmission power level.

In response to the receipt of the power down command in step 402, the base station 102 determines that it is required to reduce its downlink transmission power level to a level where downlink slots can no longer be supported. To achieve this the base station 102 begins implementing downlink transmission power reductions in a serious of steps. The number of power reduction steps may be, and sometimes is, predetermined but with the power reduction process normally being implemented in accordance with the invention in a serious of steps. In the FIG. 4 example, power reduction from the downlink power level being used at the time the power reduction command is received from an SAS in step 402 is implemented in 4 steps, e.g., with the overall downlink transmission power level allocated and used in downlink slots being reduced by 25% in each power reduction step. In other embodiments a larger number of power reduction steps are used, e.g., 5, 8 or 16 steps depending on the embodiment. In some cases the number of power reduction steps is a function of the number of UEs being served by the base station 102 with the base station using a larger number of power reduction steps when the number of UEs obtaining service from the base station is larger, e.g., over a first threshold, than when the number of UEs is smaller, e.g., equal to or below the first threshold. In this way when there are a large number of UEs obtaining service from the base station the number of UEs being forced to use other base stations for service or being voluntarily being handed off to other base stations at a given time due to the power reduction can be somewhat limited allowing for other base stations to take over responsibility for the UEs affected by the power reduction.

For example, if there are 16 UEs receiving service, e.g., downlink service, from the base station at the time the power reduction command is received, the power reduction may be implemented in 16 steps. In such a case if one UE is handed off with each power reduction step the handoff rate would be one UE per power reduction step. If there is a lower number of UEs receiving service, e.g, downlink service, from the base station, e.g., 4 UEs, the base station may determine based on the number of UEs that power reduction is to be implemented in fewer steps, e.g., 4 steps. Assuming a similar handoff rate of 1 UE handoff per power reduction step at the end of the 4 steps the UEs receiving downlink service would be handed off.

Controlling the number of power reduction steps as a function of the number of devices receiving service from the base station, e.g., all devices receiving service and/or only the number of devices using downlink slots and thus using downlink service is an optional feature and in some embodiments the number of power reduction steps is a predetermined number, e.g., preconfigured at the base station, or a number specified by the SAS which issued the power reduction command with the number of steps being signaled with the power reduction command in some cases.

Operation at each of the overall reduced downlink power levels will normally occur for a minute or more. In some cases the operation at a reduced power level corresponding to a step lasts at least two minutes but often longer. During each period of time the timing schedule, e.g., uplink/flexible/downlink slot pattern, will normally remain fixed.

In the FIG. 4 example power reduction occurs in 4 steps with the DL power being reduced by 25% in each reduction step implemented from the time the power reduction command was received.

The power reduction command was received by the base station 102 from the SAS 180 in step ST0 which corresponds to row 422. During ST0 422 the base station 102 signals to UEs that it will be reducing transmission power and optionally indicates the amount of power reduction being implemented, e.g., by signaling a new reduced transmission power level or indicating a portion of power reduction 25% that will be implemented. The signaling that DL power reduction is being implemented occurs in some embodiments in a flexible frame that is included in ST0, e.g., at the end of ST0.

In FIG. 4 in step 404 which occurs at the end of ST0 422, the base station notifies UEs that it is switching to 75% of the downlink transmission power level that was previously used in step 422. This notification in some embodiments is sent in a flexible frame included in the timing sequence of step ST0. The UEs can, and sometimes do, take this information into consideration when deciding on the number of antennas to allocate to signals being received from the base station 102 during downlink slots. For example, UEs with multiple antennas may, and sometimes do, increase the number of antennas allocated to receiving DL signals BS 102 in response to receiving the DL power reduction notification sent in step 404. By increasing the number of antennas used to receive DL signals the UEs can, at least partially, compensate for the reduction in DL transmission power.

Downlink transmission power reduction is achieved by the base station by reducing transmission power in one or more DL slots, allowing some DL slots to go unused and/or by a combination of DL slot transmission power reduction and allowing DL slots to go unused. In step ST1 424 downlink power reduction of 25% is achieved by the base station 102 intentionally allowing ¼ of the downlink slots in the timing structure being used to go unused. The downlink slots which are unused, e.g., the slots which the base station intentionally does not transmit in, are in some embodiments randomly or pseudo randomly selected. In step ST1 downlink slots numbered 1, 9 and 19 are left unused while the transmission power transmitted in DL slot 16 is half of what it was in step ST0. The difference in transmission power is shown using a change in shading between ST0 and ST1 with white being used to indicate a lack of transmission power and shading being used to show transmission power. Slot 16 is half shaded to indicate that the transmission power in DL slot 16 is 50% of what it was in step ST0 422.

Note that by leaving some DL slots unused and/or using them at reduced power, and other DL slots at full power, overall DL power reduction is achieved since average DL power is reduced. The SAS 180 when measuring interference over a period of time will detect an overall reduced power level even though DL transmission may still be at the same level used in the previous step. This approach to DL power reduction allows communication with the UEs which were being serviced but reduces the number of slots available to transmit DL data. Thus UEs will perceive a reduction in the amount of DL data they receive. Thus even if the UEs are not notified of the power reduction they will detect the loss of downlink frames due to the failure in transmission and/or may assume that the failure to receive data is due to interference. By randomizing the downlink frames which are left unused the same UEs will not be repeatedly subject to data loss and multiple UEs will be encouraged to initiate handoffs to other base stations as their downlink connections become less reliable. Accordingly, it should be appreciated that while power reduction notifications are provided in some embodiments they are not necessary in all embodiments and in some embodiments are not used with the base station 102 simply implementing the power reductions without notifying the UEs of its plan to reduce DL transmission power.

At the end of ST1 424 the base station in the FIG. 4 example notifies, in step 406 via a transmitted signal, UEs that it is going to switch to a power level corresponding to 50% of the original DL transmission power used in step 422. This notification in some embodiments is sent in a flexible frame included in the timing sequence of step ST1.

In ST2 426 the base station reduces DL transmission power to 50% of what was used in step ST0 422. This is done by allowing DL slots 0, 2, 7, 8, 10, 16 and 18 to go unused. Thus, no power is transmitted in these slots. Since half the DL slots go unused in step ST2 426 the overall DL transmission power will be 50% of that of step ST0 422. Note that because of the random or psudo random selection of downlink slots to go unused, in step ST2 some DL slots which were previously unused will be used. For example, DL slot 1 which was unused in ST1 424 is used in ST2 426.

At the end of ST2 426 the base station 102 notifies, in step 408 via a transmitted signal, UEs that the base station 102 is going to switch to a power level corresponding to 25% of the original DL transmission power used in step 422. This notification in some embodiments is sent in a flexible frame included in the timing sequence of step ST2 426.

In ST3 428 the base station 102 operates using 25% of the DL transmission power used in step 422. To do this the base station 102 allows DL slots numbered 2, 6, 8, 9, 11, 12, 16, 17, 18 and 19 to go unused. Thus in step ST3 428 ¾ of the DL slots are left unused.

At the end of ST3 428 the base station 102 notifies, in step 410 via a transmitted signal, UEs that the base station 102 is going to switch to a timing structure that does not include downlink (DL) slots. The signal notifies the UEs of the timing structure switch and based on the notification signal the UEs are informed that the base station will continue to use the timing structure without DL slots until it informs the UEs of a change to a timing structure including UL slots. The signal is sometimes referred to as a freeze frame signal because it indicates to the UEs that the base station 102 intends to switch and remain in, e.g., freeze in, a mode of operation in which a timing structure which does not include DL slots is used. Since DL slots are not supported the signal indicates to the UEs that the base station will not be allocating power to DL slot transmissions after the switch is made. Thus, this switch in timing structure represents a switch of zero transmission power being used for DL slots since the timing structure being used will not include DL slots. The freeze frame signal notifying UEs of the switch to a timing structure with no DL slots may be, and sometimes is, sent in a flexible frame slot in the timing structure being used.

In step ST4 430 the base station 102 operates in a mode of operation which uses a timing structure that does not include any DL slots. In the FIG. 4 example the DL slots previously present in the timing structure used in the other steps are shown replaced with uplink slots (U) which can be used to send signals to the base station 102. UE devices such as sensors which report data or information but do not expect to receive downlink data for extended periods of time can use the UL slots available during the time period of step ST4 to send data up to the base station 102 for delivery to other devices coupled to the base station 102, e.g., to a UE at another base station or to a server in a network which is connected to the base station 102. Optionally the base station may continue to include flexible slots in the timing structure being used but such slots in some embodiments will not be used to transmit user data and will not be treated as slots which are available to support ordinary DL data transmissions.

While the timing structure in use does not include DL slots, the BS 102 can still send timing control signals and/or command to switch between timing structures. Thus, UEs can remain in timing synchronization with the base station in some embodiments. The base station 102 can, and sometimes does, send a signal to UEs, e.g., in a flexible frame, to signal when the UEs are to switch to a timing structure which includes DL slots. Such a switch notification signal can be sent in a flexible frame following a grant from the SAS 180 indicating to the base station 102 that it can resume DL transmission and thus can once again transmit power in DL slots of a timing structure including such slots.

Figure 5:
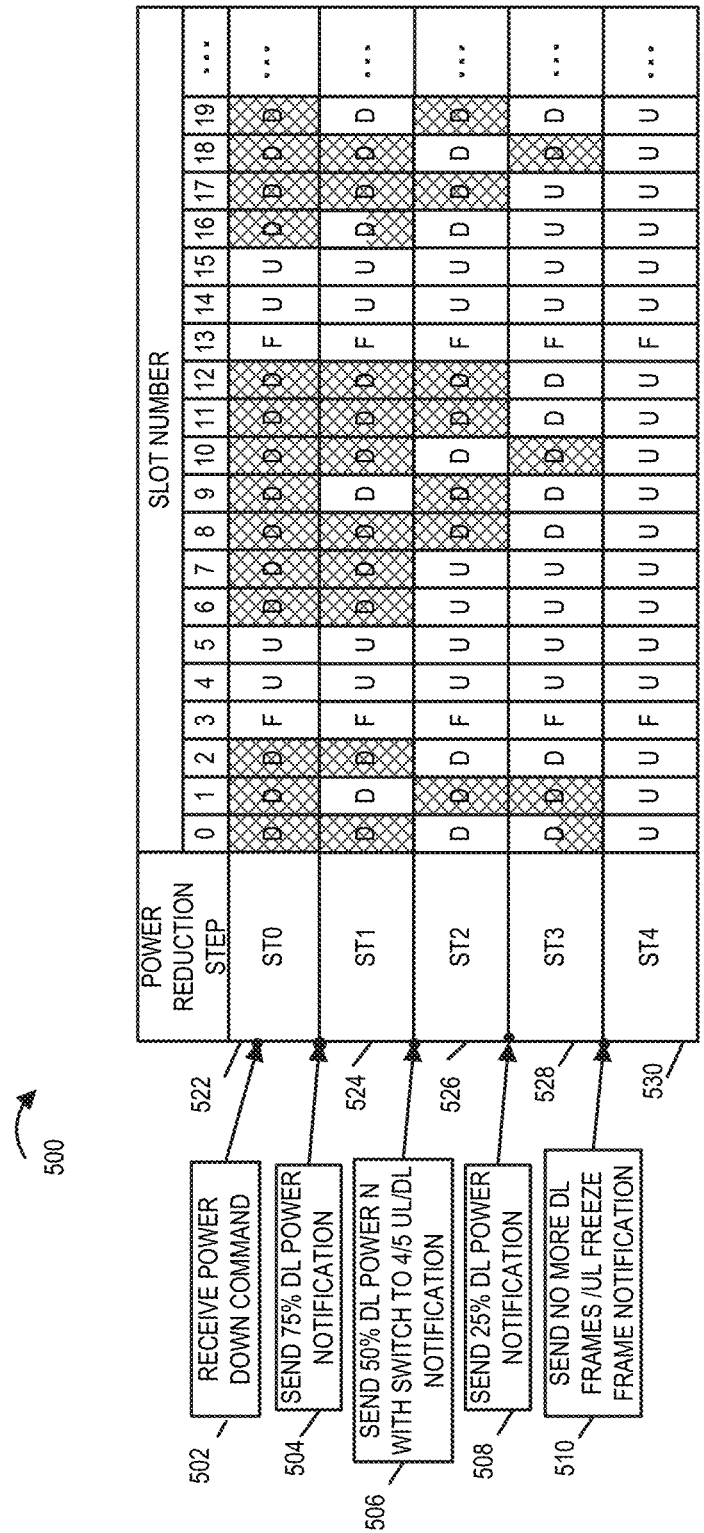
FIG. 5 illustrates a second sequence of power reduction steps, performed in some embodiments, and a corresponding pattern of uplink and downlink slots with overall downlink transmission power being reduced and with a change in the downlink to uplink slot ratio being used before switching to use of a timing structure which does not include downlink slots.

FIG. 5 is a diagram 500 illustrating a second sequence of power reduction steps, performed in some embodiments, and a corresponding pattern of uplink and downlink slots with overall downlink transmission power being reduced. However, in the FIG. 5 example a change in the downlink to uplink slot ratio is implemented before the base station switches to using a timing structure which does not include downlink slots.

FIG. 5 example is similar to the one shown in FIG. 4 in that power reduction is achieved in 4 steps. In step 522, during which the base station 102 is operating using the first timing structure 304 shown in FIG. 3 with an UL to DL ratio of 2:7, the base station receives a power down command in step 402. Then in step 504, the base station transmits a notification in step 504 indicating that it is reducing DL power to 75% of what was being used in step 522 in which the DL power command was received. In the first reduced step of DL power operation ST1 524 the base station 102 continues to use the first timing structure but allows several DL slots to go unused and reduces DL transmission power in at least some slots to achieve the desired 25% reduction in transmission power. In step 506, before transitioning to the 50% step ST2 526 of DL power operation the base station 102 signals that it is switching to using the second timing structure 306 with a 4:5 UL/DL ratio. By making this switch the base station 102 eliminates some DL slots which it frees up for use by UEs as UL slots. To achieve the desired reduction in DL power the base station 102 also selects some of the DL slots in the timing structure to be used to go unused or to be used at reduced transmission power. Optionally, in addition to notifying the UEs of the switch in timing structure the base station 102 may, and sometimes does, indicate that it is switching to using 50% of the DL transmission power that was in use in step 522 during which the power reduction command was received.

Note that in step ST2 526 downlink slots with slot numbers 0, 2, 10, 16 and 18 are left unused with no DL transmission power being transmitted in them. Note also that DL transmission power is not transmitted in slots 6 and 7 since these slots were switched to UL slots given the change in the timing structure being used. Thus, while achieving the desired step of power reduction in ST2 526, the base station 102 also increases the number of UL slots as compared to the number which were available in step ST1 524. This can be an efficient use of what would otherwise be unused DL slots.

A third power reduction is announced in optional step 508 with UEs being notified by BS 102 that the DL power is being reduced to 25% of what it was in step ST0. Note that in ST3 528 the same timing structure used in step ST2 is used but a larger number of DL frames are left unused or are subject to a partial power reduction to achieve the desired overall, e.g., average DL transmission power level of 25% the original DL transmission power used in step ST0 522.

At or near the end of step ST3 528, the base station announces in step 510 to the UEs that it is switching to using a timing structure that does not include DL slots. In step ST4 530 the timing structure that does not include DL slots is used.

ST4 530 may, and sometimes does, continue being implemented by the base station 102 until the base station 102 is given a DL authorization by the SAS, e.g., receives an SAS grant allowing the bae station to transmit sufficient DL power that allows it to support DL slots.

From the examples of FIGS. 4 and 5 it should be appreciated that the base stations 102, 152 may, and sometimes do, implement a power down process in multiple steps in response to a power down command from an SAS 180. The gradual power reduction may extend over a period of several minutes, e.g., 8 or more minutes in some but not all embodiments assuming at least 2 minutes per power reduction step and 4 power reduction steps. As part of the power reduction process the base station will signal a change in the timing structure being used, e.g., signaling at the end use of a timing structure which does not include any fixed DL slots, includes a majority of UL slots, and may include one or more flexible slots. In some cases, as part of the power reduction process before switching to the timing structure which does not include DL slots, the base station may, and sometimes does, switch between timing structures being used with the base station switching, in some embodiments, to a timing structure that includes more UL slots and less downlink slots as the amount of power reduction increases.

The steps of an exemplary method 600 of operating a base station in accordance with the invention will now be discussed with reference to FIG. 6. FIG. 6 comprises the combination of FIG. 6A, FIG. 6B, FIG. 6C and FIG. 6D.

The method 600 beings in step 602, e.g., with a base station such as exemplary CBSD 102 being operated on and beginning operation. Operation proceeds from start step to registration step 604 in which the base station 102 registers with a control device, e.g., SAS 180, to obtain a grant allowing the base station to use resources for communication including, e.g., downlink transmissions. In step 606 the base station 102 receives a grant of resources authorizing the base station to use spectrum and thus to begin transmitting. In step 608 the base station determines the timing structure to be used. The selection is between a first timing structure which is a downlink dominant timing structure, such as the one shown in row 304 of FIG. 3, or a second more balanced timing structure such as the one shown in row 306 of FIG. 3. The first timing structure may be and sometimes is selected when the base station expects a large amount of downlink traffic as opposed to uplink traffic which may be the case when supporting video downloads for example.

With the timing structure for communication having been selected in step 608 operation proceeds to step 610 in which the base station 102 supports communication, e.g., uplink and downlink communication, with one or more UEs using the supported timing structure. This involves in some embodiments receiving uplink frames in uplink slots and transmitting data to UEs in downlink frames in downlink slots.

Communications using the selected timing structure continues to an event such as a power down command occurs. In step 612 the base station 102 receives a power down command from the SAS 180. The power down command in the example requires the base station 102 to reduce downlink transmission power, e.g., to a level at which DL slots in which DL frames are transmitted can no longer be supported by the base station 102. The base station maybe given a predetermined amount of time to implement the power down command, e.g., several minutes. This time may correspond to a time period between SAS interference power measurements and/or some other interval of time. In some embodiments the SAS instructs, at the time of providing the power down command, the base station 102 to complete the power down in a particular amount of time signaled by the SAS to the base station. The SAS may and also does sometimes also the base station as to the number of power reduction steps and/or amount of power to be reduced in each of the power reduction steps. Such information may be included in information sent with the power down command. The duration the base station is to operate at each reduced power step involved in implementing the power down command can and sometimes is specified by the SAS. Thus. in some embodiments the SAS can control the rate at which the power down command is implemented and the time over which it will be implemented. This allows the SAS to influence and/or control what impact in terms of handoffs to other base stations, the power down command may have since handoffs of UEs are likely to be a function of the rate at which the power is reduced. By triggering a somewhat gradual power down the SAS can reduce the risk of neighbor base stations such as base station 152 being overwhelmed with a large number of handoff requests all at once and thus allowing for a more graceful handoff of UE communications sessions to neighboring base stations. SAS communication of power down step information and/or the period of time or times over which power down steps are to be implemented is optional and does not happen in all embodiments.

Operation proceeds from step 612 in which the power down command is received and proceeds to step 613 in which the base station determines the number of power down (power reduction) steps to use in the multi-step power reduction operation implemented in response to the power down command and/or the size (e.g., amount of power reduction) of each the steps.

Steps 612 may be implemented in a number of ways using information from the SAS, prestored information and/or based on information on the number of users being serviced by the SAS. Depending on the embodiment the base station may implemented one more or all of sub steps 614, 615, 616 as part of step 613.

In some embodiments the base station 102 is programed, e.g., preconfigured, to use a predetermined number of steps, e.g., 4, 8, 16, etc., in implementing a power down command. In some such embodiments the amount, size of downlink power reduction, is also preconfigured. The size of the power reduction may be specified as a percent or fraction of the average, e.g., overall, DL power being used for DL slot transmissions at the time the power down command is received and/or a size or percentage of the amount of power in use after the most recent power reduction was implemented. In the case where power reduction is a fraction of the amount used in the last step, upon reaching some predetermined power level the next step is a zero thereby making a potential infinite number of steps into a finite number of steps.

In sub step 614, when it is used as part of step 613, the base station determines the number of steps and/or step sizes based on SAS provided information, e.g., information specified or provided with the power down command or at some other time. In sub step 615 the base station determines the number of power reduction steps and/or power reduction step sizes (amount of power reduction to be performed in individual steps) from stored information, e.g., preprogramed information that specifies the number of steps and/or percentage or fraction of power reduction to be performed in individual steps. This information maybe programed or stored in the base station at start up or at another point in time during which the base station is loaded with configuration information.

In sub step 615, when it is used as part of step 613, the base station determines the number of steps and/or step sizes from stored information, e.g., preconfigured information specifying the number of steps or percent power reduction to be implemented per step of the multi-step DL power reduction process. This information can include a stored number of steps and/or per step power reduction information stored in the base station 102 when it is configured.

In sub step 616, when it is used as part of step 613, the base station determines the number of steps and/or step sizes based on a threshold number of devices, e.g., UEs/STAs, being serviced. For example, the threshold may be, and sometimes is, a number such as 4 or 16. The number of power reduction steps is larger in at least some embodiments when the number of devices receiving service from the base station 102 is greater than when the number is lower or equal to the threshold. Thus, when the BS 102 is servicing a large number of UEs the power reduction will occur over a larger number of steps and increase the chance that the handoffs of all or some of the UEs will be spread out over a longer period of time than if only a few UEs, e.g., a number below the threshold number, were receiving service from the BS at the time the power reduction command was received. For purposes of making comparisons to the threshold the BS may consider the total number of UEs receiving service from the BS or, in some cases, considers the number of UEs to those which are using the DL slots, i.e., receiving downlink data delivery vis the BS 102.

With the number of power reduction steps and power reduction step sizes having been determined in step 613, operation proceeds to step 617 in which a power reduction step counter (PRSC) is initialized to 0. This counter will be incremented and used in determining when the last power reduction step has been reached and the BS 102 is to switch to a no downlink slot mode of operation, e.g., a mode in which uplink slots/uplink frames are only supported or a mode in which a combination of uplink and flexible slots and corresponding frames are supported by including slots for such frames in the timing structure being used.

Operation proceeds from step 617 to step 623 (see FIG. 6B) either directly via connecting node 619 or in embodiments where step 618 is used via step 618 and then connecting node 619. Step 618 is an optional step and involves determining if a switch is to be made in the timing structure used prior to the switch to use of the timing structure which does not include DL slots. Step 618 is particularly useful where a downlink dominant frame format is initially used and the number of power reduction steps will result in a large number of DL frames being left unused. In such a case it can be useful to switch from a DL dominant format to a format with more UL slots/frames so that UE's can begin using the slots that were previously used as downlink slots four uplink signaling rather than allow them to go completely unused. In step 618 the base station determines if a switch is to be made from using a first downlink dominant timing structure such as the one shown in row 304 of FIG. 3 to a second timing structure with amore balanced uplink to downlink slot ratio such as the one shown in row 306. If it is determined that such a switch is to be made, e.g., because it is determined that there will be a sufficient number of unused DL slots which could be used as UL slots to support the second timing structure, a determination is also made as to at what point, e.g., step, of the power reduction process the switch is to be made so that the switch in timing structure can be communicated to UEs in time for it to be used in a particular power reduction step. FIG. 5 shows an example of an embodiment in which optional step 618 is used.

FIG. 6B shows a second part 620 of the flow chart of FIG. 6 which is reached via connecting node A 619. Portion 620 shows a first part of a multi-step overall DL transmission power reduction step 623 with the second part of this step being shown in FIG. 6C in diagram 650. In step 623 overall, e.g., average, power for downlink transmission is reduced in a serious of iterative steps. The step 623 begins in step 622 in which the power reduction step counter (PRSC) is incremented by one. Then operation proceeds to step 624 in which a check is made to determine if this the last power reduction step to be implemented as part of switching to a no DL time structure format. In some embodiments in step 624 the step counter value PRSC is compared to the number of steps determined in step 613 and if the numbers match it is the last power reduction step and operation proceeds to step 636 which will be discussed below. Otherwise it is not the last power reduction step and operation proceeds from step 624 to step 626.

In step 626 a check is made to determine if a switch is to be made from using one transmission timing schedule, e.g., the first downlink dominant timing structure to another timing structure which include DL slots, i.e., the second timing structure which is more balanced in terms of DL and UL slots. This decision is made based on the determination of whether or not to switch and when that was made in step 618. If a switch is not supported steps 618, 626 and 630 can be omitted with operation proceeding directly from step 624 N output to step 631.

If in step 626 it is determined that a switch is to be made from the first downlink dominant format timing structure to the second timing structure, e.g., because the transmission reduction step counter matches the step at which it was determined the switch was to be made in step 618, operation proceeds to step 630 where the switch to the second timing structure is made. While the switch is implemented at the base station in step 630 it becomes effective after the UEs are notified of the switch in step 631 to which operation proceeds after step 630.

If in step 626 it is determined that a switch to the second timing structure is not to be made, operation proceeds to step 628 in which the BS 102 continues using the first timing structure or whatever timing structure was being used at the time the power reduction command was received. For example, if the second timing structure was in use at the time the power reduction command was received there would be no reason to switch to the second timing structure since it was already in use and would continue to be used.

Operation proceeds from step 628 to device notification step 631. Thus step 631 is reached regardless of whether the power reduction step being implemented involves a change in timing structure format or not. In step 631 the base station 102 sends a signal, e.g., a notification, command or control message, to UEs/STAs signaling the planned decrease in DL transmission power and/or the change in timing structure which will be implemented as part of the upcoming power reduction step. Step 631 in some embodiments includes decrease in DL transmission power notification step 632 and/or timing structure change notification 633. The timing structure change notification 633 is not sent if there is no planned change in the timing structure. In some embodiments the notifications 632 and/or 633 are sent in a flexible frame preceding the timing structure slot at which the change in timing structure and/or DL power level will be effective. In some embodiments the notifications sent in step 631 are at a fixed known slot timing offset from the point at which the information indicated in the notification is effective. Operation proceeds from UE notification step 631 to step 646 (See FIG. 6C) via connecting node 644.

In step 646 the base station determines the number of DL slots in a recurring period of time in the timing structure being used to which overall power reduction is to be applied to achieve the overall DL transmission power corresponding to the power reaction step being implemented. For example, if a 25% power reduction was being implemented transmission power may be avoided in 25% of the available DL slots, e.g., by avoiding transmitting in some slots and/or transmitting at a reduced power or for a portion of another DL slot.

Operation proceeds from step 646 to step 648 in which the base station 102 then selects, e.g., randomly or pseudo-randomly, the determined number of DL from those available in the timing structure being used. By randomly or pseudo randomly selecting the slots, the impact of power reduction is spread out over time and/or devices using the slots in a manner that reduces the risk there will be full DL power used in a period of time the SAS might choose to measure DL power or that the same power will be detected by the SAS if relative short power measurements are made in a fixed recurring pattern. In addition, the loss of data in DL slots may appear random to UEs and is likely to be interpreted as being due to a poor channel in the case where UEs are not notified of DL power reduction operations. Thus, UEs can be encouraged even without power reduction notifications by there normally channel selection procedures to seek an alternative base station to connect to when DL power reduction is implemented.

Operation proceeds from step 648 to step 649 in which the base station reduces the overall amount of DL transmission power used during a period of time for downlink transmission by: i) allowing some DL slots to go unused; ii) reducing the transmission power level used in some DL slots or iii) both allowing some DL slots to go unused and reducing the transmission power level used in some DL slots. See previously discussed FIGS. 4 and 5 for examples of how DL power reduction is achieved in some embodiments.

With downlink power reduction being applied, in step 650 the base station 102 communicates with devices, e.g., UEs and/or STAs, using the determined timing structure while applying full or partial power reduction to one or more frames transmitted in the available DL slots. In step 652 a check is made if it is time to more to the next power reduction step. Communication in a step using a power level can continue for a minute, two minutes or longer in many cases. If in step 652 it is determined that the time to move to the next reduced transmission power level has not been reached communication operation continues in step 650.

If, however, the time to which to the next reduced power level has bene reached operation proceeds via connecting node D 654 back to step 622 of FIG. 6B where the transmission power level counter is incremented and then operation proceeds as shown in FIG. 6B with steps associated with implementing the next power level step being implemented.

Referring now once again to step 624 of FIG. 6B, if it was determined in step 624 that the transmission power reduction step to be implemented is the last transmission power reduction step meaning that after the step is implemented the power used for base station DL transmission slots will be zero since a switch is being made to a timing structure which does not include DL slots, operation proceeds from step 624 to step 636.

In notification step 636 the base station 102 transmits a notification indicating that a switch to a no downlink slot timing structure is being made. This is sometimes done using what is referred to herein as a freeze frame or uplink only notification signal. The notification in some embodiments is sent in a flexible slot in the timing structure being used at the time the notification signal is sent. In some embodiments the notification indicates to UEs/STAs that after the indicated change the timing structure being used will not include any DL slots and thus BS will not send data or transmit signals in DL slots until the BS 102 sends a notification that will be switching to a timing structure including DL slots. Row 430 of FIG. 4 shows a no DL slot timing structure used after the notification is sent in step 636.

From step 636 operation proceeds to step 638 in which the base station 102 switches to using the no DL slot timing structure. Then operation proceeds via connecting node C 640 to step 664 of FIG. 6D which shows part 660 of the method of FIG. 6. Note that at this point the BS 102 has switched to using a timing structure without DL slots and thus no data transmission to UEs in DL slots since the DL slots have been eliminated.

In step 664 the BS 102 communicates with devices using the determined timing structure which does not include DL slots and thus the communication does not involve the transmission of user data to user devices in DL slots. Step 664 includes in some embodiments steps 666 and/or step 668. In step 666 the base station 102 receives uplink data from one or more devices, e.g., UEs or STAs in UL frames communicated in UL slots. Since DL slots are not present the timing structure includes a large number of UL slots making it well suited for sensors or other devices which send a lot of uplink data and do not require downlink data or only require DL data at very long intervals allowing such devices to communicate with the BS 102 for a long time after DL frames are eliminated from the timing structure being used by the BS 102. In some embodiments while DL slots are eliminated and not present in the timing structure used, the base station 102 may and sometimes does transmit timing, base station identification (BSID) and/or other control information as part of step 668 which is shown as an optional sub step of communications step 664. Such transmissions may occur in flexible frames or on a brief and sparse basis that they do not run afoul of DL transmission power constraints by creating significant amounts of interference to incumbent devices using the same spectrum as the BS 102. Operation will continue in step 664 until the base station shuts down or receives authorization, e.g., a power or spectrum grant, from the SAS.

In step 670 the BS 102 monitors for a power increase authorization from the control device, e.g., SAS 180. This monitoring goes on while the communication step 664 proceeds. In step 674 a check is made to determine if a power increase authorization, e.g., a grant form the SAS 180, was received. If in step 674 it is determined that a power increase authorization was not received operation is shown proceeding back to step 664 to indicate that communication using the timing structure which does not include DL transmission slots will proceed until a DL power authorization is received.

In step 674 if it is determined that a DL power increase authorization is received, operation proceeds to step 676 in which the base stations switch to using a timing structure which includes DL slots for DL data frames. In step 678 the base station communicates the switch to the timing structure including DL frames to devices to which it provides service, e.g., UEs/STAs. The communication, e.g., transmission of an indication of the new timing structure that is being used, may occur in a flexible slot transmitted using the no DL slot or in a slot corresponding to the new timing structure. Thus, the notification of a switch to a timing structure including DL data slots is set before or after the base station 102 begins transmitting/receiving in accordance with the timing structure including DL and UL slots.

In step 680 the BS communicates with devices at the authorized power level allowing DL slot transmissions and process using the timing structure and DL transmission power level constraints until powered off, a new resource grant or power level authorization is received form the control device, e.g., SAS 180, or a power down command is received.

From the above it should be appreciated that the methods reduce the risk that a large number of UEs will be dropped at the same time from BS 102 due to a power down command and thus reduces the risk of handoff signaling congestion that might occur due to such a sudden DL termination. In addition, the method allows for slots previously used as DL slots to be switched and used to uplink slots making more efficient use of communications resources than might be the case if all BS connections and/or UEs were dropped in response to a BS power down instruction from an SAS 180.

Numerous variations on the above described methods and apparatus are possible. In one exemplary implementation a base station, e.g., CBSD 102, connects with a network that uses a spectrum access system (SAS) 180 and the SAS 180 grants spectrum to CBSD, 102. When Interference increases in the granted spectrum band, the SAS 180 sends a power down message to the CBSD 102. In one time division duplex (TDD) embodiment the CBSD normally uses 7:2 DL:UL slot format, which means there will be 7 DL slots and 2 UL slots in one subframe. When SAS sends power down message, CBSD powers down all of the DL slots. While doing this will cause the power reduction in DL, since when there is no transmission in DL slots, then DL transmission power will be zero or nearly zero. A sudden switch to zero DL power can be undesirable due to the disruption to the UEs that such a sudden change can cause. In at least one exemplary embodiment power for DL slots is reduced gradually, e.g., for the first 2 minutes, only 60% of power is transmitted in randomly or pseudo randomly selected DL slots. Then the power in DL slots will keep reduced further and held constant for a period of time, e.g., the next 2 minutes. For example transmission may be implemented at 40% of the original power level. The power reduction process will repeat in a number of steps until a switch is made to zero power being transmitted by the base station (CBSD) 102 in DL slots. In some embodiments when the power in all DL slots are reduced to zero, the power used or allowed in UL slots will be kept at 100% of what it was when the DL power down command was received. That is, in terms of power that UEs or other devices including the BS 102 can use during UL slots nothing changes. When the power in all of the DL slots has been reduced to zero or is about to be reduced to zero, a timing structure change signal sometimes referred to as a freeze frame signal is transmitted, e.g., in a flexible slot, to make all slots UL slots. The base station 102 and UEs will continue to use the uplink slots until the base station 102 is authorized to resume DL slot transmissions by receiving a new or updated SAS grant or the base station 102 powers off.

Figure 7A:
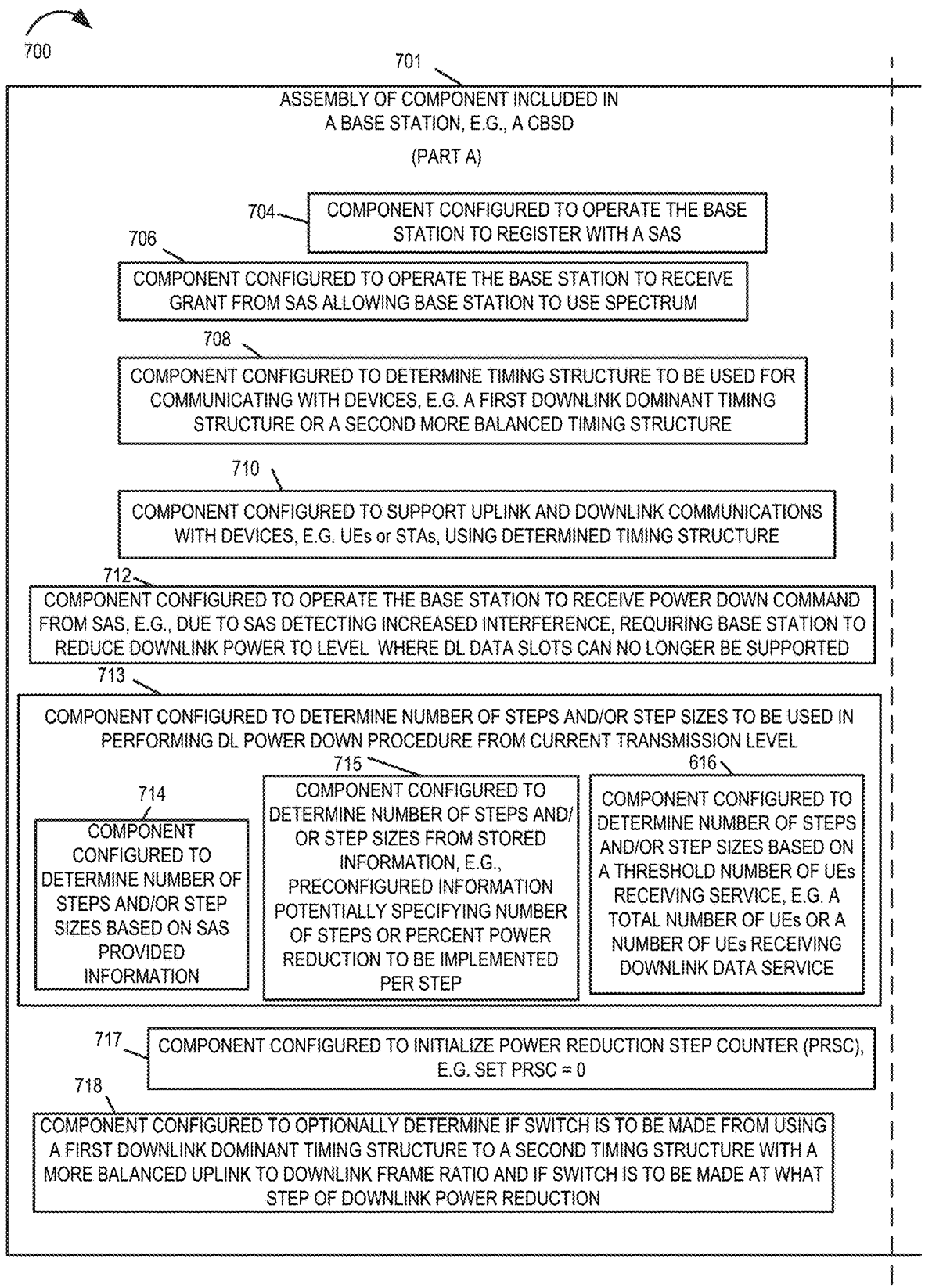
FIG. 7A is a first part of an exemplary assembly of components which may be included in an exemplary base station, e.g. a CBSD, in accordance with an exemplary embodiment.
Figure 7B:
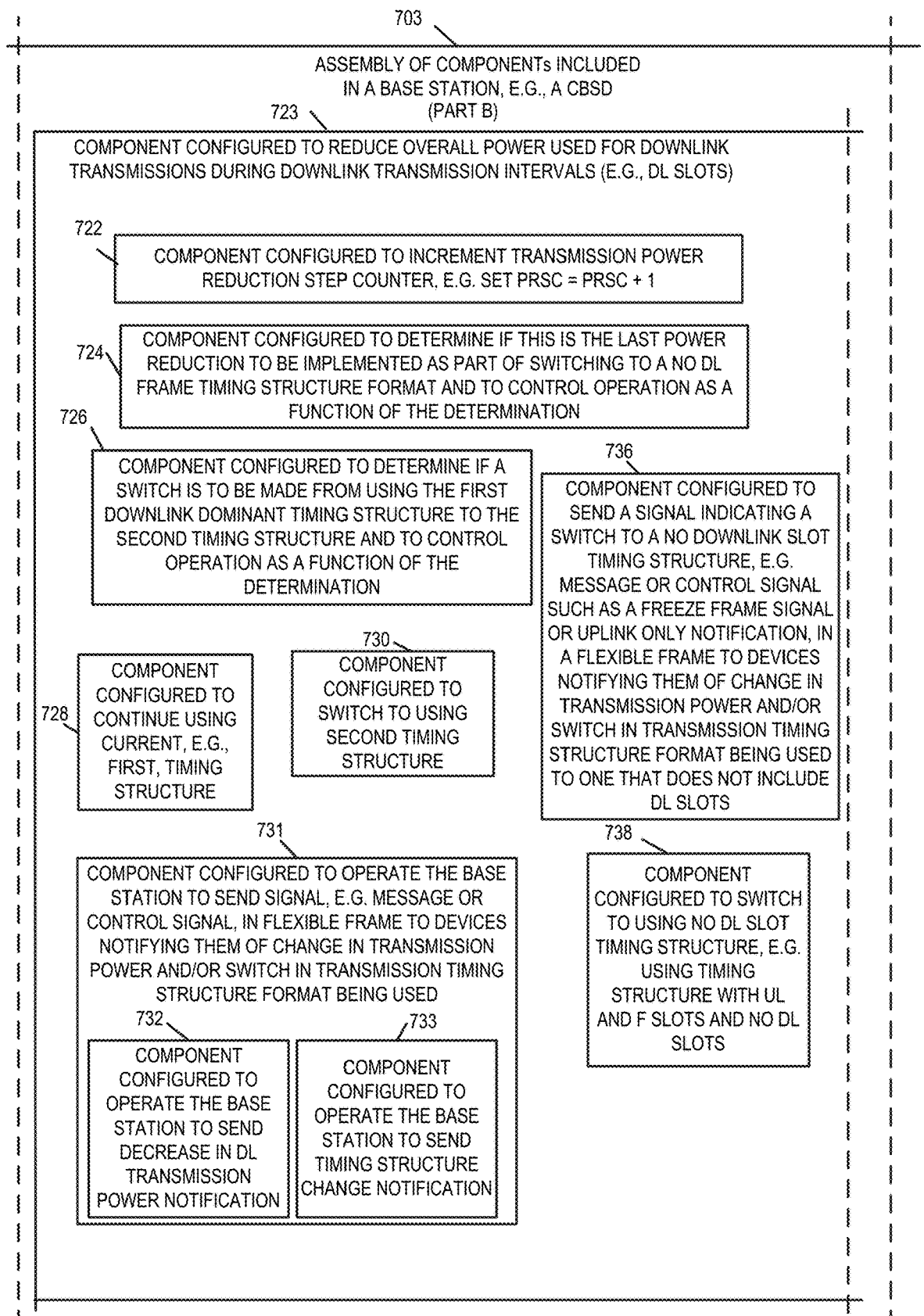
FIG. 7B is a second part of an exemplary assembly of components which may be included in an exemplary base station, e.g. a CBSD, in accordance with an exemplary embodiment.
Figure 7C:
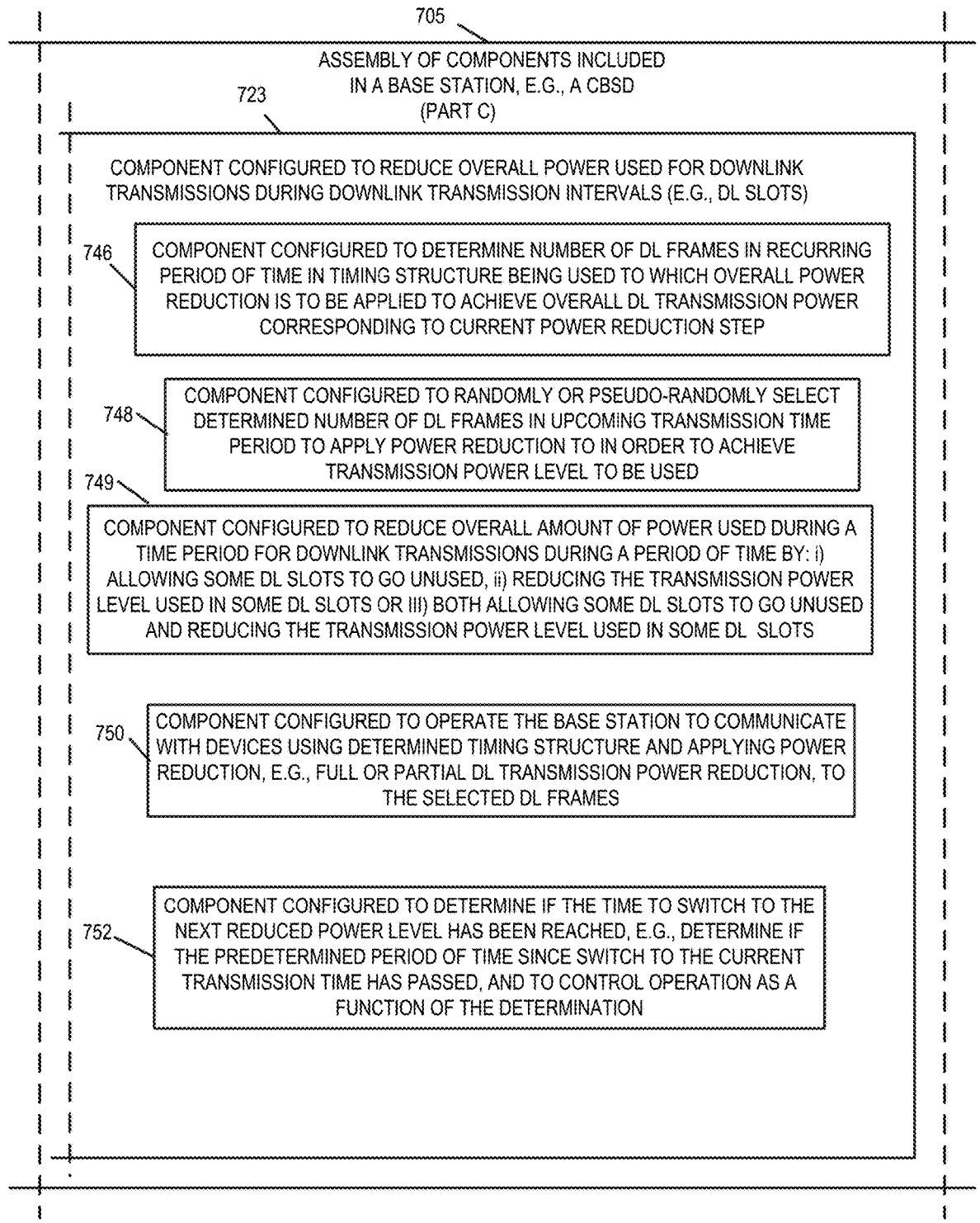
FIG. 7C is a third part of an exemplary assembly of components which may be included in an exemplary base station, e.g. a CBSD, in accordance with an exemplary embodiment.
Figures 7, 7D:
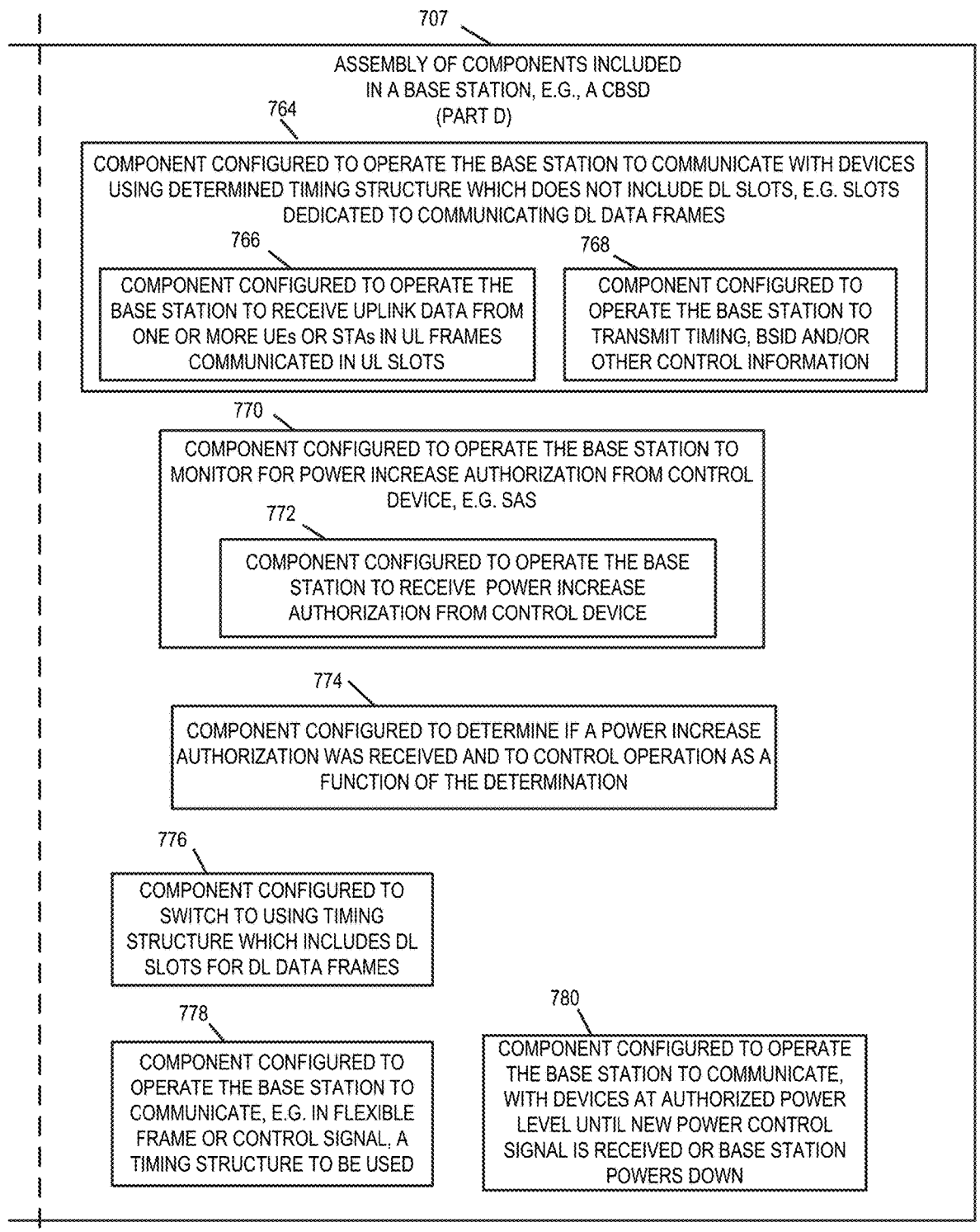
FIG. 7D is a fourth part of an exemplary assembly of components which may be included in an exemplary base station, e.g. a CBSD, in accordance with an exemplary embodiment.
FIG. 7 comprises the combination of FIG. 7A, FIG. 7B, FIG. 7C and FIG. 7D.

FIG. 7, comprising the combination of FIG. 7A, FIG. 7B, FIG. 7C and FIG. 7D, is a drawing of an exemplary assembly of components 700, comprising Part A 701, Part B 703, Part C 705 and Part D 707, which may be included in an exemplary base station, e.g. a CBSD, in accordance with an exemplary embodiment. The base station including assembly of components 700 is, e.g., base station 1 102 of FIG. 1, base station M 152 of FIG. 1, base station 200 of FIG. 2, or a base station implementing the method of flowchart 600 of FIG. 6.

The components in the assembly of components 700 can, and in some embodiments are, implemented fully in hardware within a processor, e.g., processor 202, e.g., as individual circuits. The components in the assembly of components 700 can, and in some embodiments are, implemented fully in hardware within the assembly of hardware components 210, e.g., as individual circuits corresponding to the different components. In other embodiments some of the components are implemented, e.g., as circuits, within processor 202 with other components being implemented, e.g., as circuits within assembly of components 210, external to and coupled to the processor 202. As should be appreciated the level of integration of components on the processor and/or with some components being external to the processor may be one of design choice. Alternatively, rather than being implemented as circuits, all or some of the components may be implemented in software and stored in the memory 212 of the base station 200, with the components controlling operation of base station 200 to implement the functions corresponding to the components when the components are executed by a processor e.g., processor 202. In some such embodiments, the assembly of components 700 is included in the memory 212 as part of an assembly of software components 240. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 202, configure the processor to implement the function corresponding to the component. In embodiments where the assembly of components 700 is stored in the memory 212, the memory 212 is a computer program product comprising a computer readable medium comprising code, e.g., individual code for each component, for causing at least one computer, e.g., processor 202, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the base station 200 or elements therein such as the processor 202, to perform the functions of corresponding steps illustrated and/or described in the method of one or more of the flowcharts, signaling diagrams and/or described with respect to any of the Figures. Thus, the assembly of components 700 includes various components that perform functions of corresponding one or more described and/or illustrated steps of an exemplary method, e.g., steps of the method of flowchart 600 of FIG. 6.

Assembly of components 700 includes a component 704 configured to operate the base station to register with a SAS, a component 706 configured to operate the base station to receive a grant from the SAS allowing the base station to use spectrum, a component 708 configured to determine the timing structure to be for communicating with devices, e.g. a first downlink dominant timing structure or a second more balanced timing structure, and a component 710 configured to support uplink and downlink communications with devices, e.g. UEs or STAs, using the determined timing structure. Assembly of components 700 further includes a component 712 configured to operate the base station to receive a power down command from SAS, e.g. dur to SAS detecting increased interference, requesting the base station to reduce downlink power to a level where DL data slots can no longer be supported, and a component 713 configured to determine the number of steps and/or step sizes to be used in performing a DL power downlink procedure from current transmission level. Component 713 includes a component 714 configured to determine the number of steps and/or step sizes based on SAS provided information, a component 715 configured to determine the number of steps and/or step sizes from stored information, e.g. preconfigured information potentially specifying the number of steps or percent power reduction to be implemented, and a component 716 configured to determine a number of steps and/or step sizes based on aa threshold number of UEs receiving service, e.g., a total number of UEs or a number of UEs receiving DL data service. Assembly of components 700 further includes a component 717 configured to initialize a power reduction step counter (PRS), e.g., set PRS=0, and a component 718 configured to optionally determine if a switch is to be made from using a first downlink dominant timing structure to a second timing structure with a more balanced uplink to downlink frame rate and if the switch is to be made at what step of downlink power reduction.

Assembly of components 700 further includes a component 723 configured to reduce overall power used for downlink transmission during downlink transmission intervals (e.g., SL slots). Component 723 includes a component 722 configured to increment the transmission power reduction step counter, e.g. set PRSC=PRSC+1, a component 724 configured to determine if this is the last power reduction to be implemented as part of switching to a no DL frame timing structure format and to control operation as a function of the determination, a components 728 configured to continue using the current, e.g. first timing structure, a component 720 configured to switch to using the second timing structure, and a component 721 configured to operate the base station to send signal, e.g. message or control signal, in a flexible frame to devices notifying them of a change in transmission power and/a switching in the transmission timing structure format being used. Component 731 includes a component 732 configured to operate the base station to send a decrease in DL transmission power notification and a component 733 configured to operate the base station to send a timing structure change notification. Component 723 further includes a component 736 configured to send a signal indicating a switch to a no downlink slot timing structure, e.g. message or control signal such as a freeze frame signal or uplink only notification, in a flexible frame to devices notifying them of a change in transmission power and/or a switch in transmission timing structure being used to one that does not include DL slots, and a component 738 configured to switch to using a no DL slot timing structure, e.g. using a structure with UL and F slots and with no DL slots. Component 723 further includes a component 746 configured to determine the number of DL frames in a recurring period of time in the timing structure being used to which overall power reduction is to be applied to achieve overall DL transmission power corresponding to current power reduction step, a component 748 configured to randomly or pseudo-randomly select the determined number of DL frames in an upcoming time period to apply power reduction to in order to achieve the transmission power level to be used, a component 749 configured to reduce the overall amount of power used during a time period for downlink transmission during a period of time by: i) allowing some DL slots to go unused, ii) reducing the transmission power level used in some DL slots or iii) both allowing some DL slots to go unused and reducing the transmission power level used in some DL slots, a component 750 configured to operate the base station to communicate with devices using the determined timing structure and applying power reduction, e.g. full or partial DL transmission power reduction, to the selected DL frames, and a component 752 configured to determine if the time to switch to the next reduced power level has been reached, e.g., determine if a predetermined period of time since the switch to the current transmission time has passed and to control operation as a function of the determination.

Assembly of components 700 further includes a component 764 configured to operate the base station to communicate with devices using a determined timing structure which not include DL slots, e.g. slots dedicated to communicating DL frames. Component 764 includes a component 766 configured to operate the base station to receive uplink data from one or more UEs or STAs in UL frames communicated in UL slots, and a components 768 configured to operate the base station to transmit timing, BSID and/or other control information. Assembly of components 700 further includes a component 770 configured to operate the base station to monitor for a power increase authorization from a control device, e.g., a SAS. Component 770 includes a component 772 configured to operate the base station to receive a power increase authorization from a control device. Assembly of components 700 further includes a component 774 configured to determine if a power increase authorization was received and to control operation as a function of the determination, a component 776 configured to switch to using timing structure which included DL slots for DL frames, a component 778 configured to operate the base station to communicate, e.g. in a flexible frame or control signal, a timing structure to be used, and a component 780 configured to operate the base station to communicate with devise at authorized power level until new power signal is received or the base station powers down.

Exemplary Numbered Method Embodiments

Numbered method embodiment 1. A method of operating a base station (102) (e.g., CBSD which is required to comply with SAS power control commands), the method comprising: receiving (612) a power down message (e.g., message from an SAS or other base station power management device that the base station must stop downlink transmissions in a frequency band being used by the base station); and reducing overall power used for downlink transmissions during downlink transmission time intervals (e.g., DL slots), in response to the power down message, in a series of incremental downlink power reduction steps.

Numbered method embodiment 2. The method of Numbered method embodiment 1, where said downlink transmission time intervals are longer than a minute in duration (e.g., 2 or more minutes in some embodiments).

Numbered method embodiment 3. The method of Numbered method embodiment 1, wherein said incremental downlink power reduction steps are of a predetermined size relative to the downlink transmission power (e.g., with downlink reduction to 0 downlink power transmissions occurring in 4 steps (25% reduction step sizes), 5 steps (20% reduction step sizes) or 16 steps in some embodiments) (e.g. with each time period at which a power level is used lasting more than a minute and including multiple frame times and/or transmission slots).

Numbered method embodiment 4. The method of Numbered method embodiment 1, wherein reducing overall power used for downlink transmissions during downlink transmission time intervals, in a series of incremental downlink power reduction steps includes: determining (614) the number of power reduction steps to be used in performing DL power down procedure to reach zero power in DL slots includes: i) determining the number of steps based on predetermined stored information (e.g., a predetermined stored number of steps or a power reduction predetermined step size to be used and/or ii) a number of users being serviced by the base station (e.g., if the number of users is over below or equal a first threshold number, e.g., 16 users, use a first number of reduction steps, e.g., 4, but if the number of users is over the first threshold number then use a second larger number of power reduction steps, e.g., 8 or 16).

Numbered method embodiment 5. The method of Numbered method embodiment 1, further comprising: sending (636) a notification of a switch to a no downlink slot timing structure (e.g., an uplink only notification signal (e.g., freeze frame signal)) indicating that there will be no downlink slots following the switch to no downlink slot timing structure until such time the base station sends an indication that downlink slots are supported.

Numbered method embodiment 6. The method of Numbered method embodiment 1, wherein reducing (623) overall power used for downlink transmissions during downlink transmission time intervals, in response to the power down message, in a series of incremental downlink power reduction steps includes: reducing the overall amount of power used during a first time period for downlink transmission by i) allowing some downlink slots to go unused during said first time period, ii) reducing the transmission power level used in some downlink slots or ii) by both allowing some downlink slots to go unused during said first time period and reducing the transmission power level used in some downlink slots.

Numbered method embodiment 7. The method of Numbered method embodiment 6, further comprising: selecting (648), one or more downlink slots to go unused during said first time period (e.g., randomly or pseudo randomly selecting a fraction of available downlink slots to go unused to achieve desired power reduction or to achieve a portion of the desired power reduction with the remaining amount of the desired power reduction being achieved by reduction of downlink transmission power used during one or more downlink slots during the first time period).

Numbered method embodiment 8. The method of Numbered method embodiment 7, further comprising: transmitting information (632) (e.g., using a flexible frame) indicating a decrease in overall downlink transmission power being used by the base station (this provides information to a UE indicating that it may encounter downlink communications problems going forward, may want to increase the number of antennas allocated to the downlink to increase energy capture and/or start looking for a new base station to use for connectivity—the notification may and sometimes does indicate the amount of power reduction being implemented and/or indicating a new maximum downlink transmission power level that will be supported by the base station for transmissions in slots which are used).

Numbered method embodiment 9. The method of Numbered method embodiment 8, further comprising: transmitting information indicating a timing structure change (633) indicating an increase in the relative number of uplink slots to downlink slots (this is an optional feature that is used in some embodiments to switch from a downlink dominant slot timing structure to an uplink dominant slot timing structure as the amount of overall, e.g., average, downlink transmission power is reduced (this allows for the required power reduction to be implemented while allowing more slots to be used for uplink as the reduction in the amount of power increases).

Numbered method embodiment 10. The method of Numbered method embodiment 7, wherein sending (638) said switch to no DL slot timing notification signal indicating that slots following the uplink only notification signal will be UL slots until such time the base station sends an indication that downlink slots are supported is sent to notify UEs that a switch in base station operation is being made to a mode in which zero transmission power is allocated to downlink transmission.

Numbered method embodiment 11. The method of Numbered method embodiment 7, wherein sending said uplink only notification signal is sent using a flexible frame in a timing structure being used by said base station (e.g., where said flexible frame being available for used said base station to communicate information selected by said base station and can be used to signal changes in power level or switches in the timing structure being used by the base station.

Exemplary Numbered Apparatus Embodiments

Numbered apparatus embodiment 1. A base station (102) (e.g., CBSD which is required to comply with SAS power control commands), the base station comprising:
  a receiver;
  a transmitter; and
  a processor configured to control the base station to: receive (612) a power down message (e.g., message from an SAS or other base station power management device that the base station must stop downlink transmissions in a frequency band being used by the base station); and reduce overall power used for downlink transmissions during downlink transmission time intervals (DL slots), in response to the power down message, in a series of incremental downlink power reduction steps.

Numbered apparatus embodiment 2. The base station of Numbered apparatus embodiment 1, where said downlink transmission time intervals are longer than a minute in duration (e.g., 2 or more minutes in some embodiments).

Numbered apparatus embodiment 3. The base station of Numbered apparatus embodiment 1, wherein said incremental downlink power reduction steps are of a predetermined size relative to the downlink transmission power (e.g., with downlink reduction to 0 downlink power transmissions occurring in 4 steps (25% reduction step sizes), 5 steps (20% reduction step sizes) or 16 steps in some embodiments) (e.g. with each time period at which a power level is used lasting more than a minute and including multiple frame times and/or transmission slots).

Numbered apparatus embodiment 4. The base station of Numbered apparatus embodiment 1, wherein the processor is configured, as part of being configured to control the base station to reduce overall power used for downlink transmissions during downlink transmission time intervals, in a series of incremental downlink power reduction steps, to control the base station to: determine (614) the number of power reduction steps to be used in performing DL power down procedure to reach zero power in DL slots includes: i) determining the number of steps based on predetermined stored information (e.g., a predetermined stored number of steps or a power reduction predetermined step size to be used and/or ii) a number of users being serviced by the base station (e.g., if the number of users is over below or equal a first threshold number, e.g., 16 users, use a first number of reduction steps, e.g., 4, but if the number of users is over the first threshold number then use a second larger number of power reduction steps, e.g., 8 or 16).

Numbered apparatus embodiment 5. The base station of Numbered apparatus embodiment 1, wherein the processor is further configured to control the base station to: send (636) a notification of a switch to a no downlink slot timing structure (e.g., an uplink only notification signal (e.g., freeze frame signal)) indicating that there will be no downlink slots following the switch to no downlink slot timing structure until such time the base station sends an indication that downlink slots are supported.

Numbered apparatus embodiment 6. The base station of Numbered apparatus embodiment 1, wherein the processor is further configured, as part of being configured to control the base station to reduce (623) overall power used for downlink transmissions during downlink transmission time intervals, in response to the power down message, in a series of incremental downlink power reduction steps to control the base station to: reduce the overall amount of power used during a first time period for downlink transmission by i) allowing some downlink slots to go unused during said first time period, ii) reducing the transmission power level used in some downlink slots or ii) by both allowing some downlink slots to go unused during said first time period and reducing the transmission power level used in some downlink slots.

Numbered apparatus embodiment 7. The base station of Numbered apparatus embodiment 6, wherein the processor is further configured to control the base station to: select (648), one or more downlink slots to go unused during said first time period (e.g., randomly or pseudo randomly selecting a fraction of available downlink slots to go unused to achieve desired power reduction or to achieve a portion of the desired power reduction with the remaining amount of the desired power reduction being achieved by reduction of downlink transmission power used during one or more downlink slots during the first time period).

Numbered apparatus embodiment 8. The base station of Numbered apparatus embodiment 7, wherein the processor is further configured to control the base station to: transmit information (632) (e.g., using a flexible frame) indicating a decrease in overall downlink transmission power being used by the base station (this provides information to a UE indicating that it may encounter downlink communications problems going forward, may want to increase the number of antennas allocated to the downlink to increase energy capture and/or start looking for a new base station to use for connectivity—the notification may and sometimes does indicate the amount of power reduction being implemented and/or indicating a new maximum downlink transmission power level that will be supported by the base station for transmissions in slots which are used).

Numbered apparatus embodiment 9. The base station of Numbered apparatus embodiment 8, wherein the processor is further configured to control the base station to: transmit information indicating a timing structure change (633) indicating an increase in the relative number of uplink slots to downlink slots (this is an optional feature that is used in some embodiments to switch from a downlink dominant slot timing structure to an uplink dominant slot timing structure as the amount of overall, e.g., average, downlink transmission power is reduced (this allows for the required power reduction to be implemented while allowing more slots to be used for uplink as the reduction in the amount of power increases).

Numbered apparatus embodiment 10. The base station of Numbered apparatus embodiment 7, wherein the processor is further configured, as part of being configured to control the base station to send (638) said switch to no DL slot timing notification signal to notify UEs that a switch in base station operation is being made to a mode in which zero transmission power is allocated to downlink transmission.

Numbered apparatus embodiment 11. The base station of Numbered apparatus embodiment 7, wherein said processor is configured to control the base station to send said uplink only notification signal is sent using a flexible frame in a timing structure being used by said base station (e.g., where said flexible frame being available for used said base station to communicate information selected by said base station and can be used to signal changes in power level or switches in the timing structure being used by the base station).

Exemplary Numbered Machine Readable Medium Embodiments

Non-transitory machine readable embodiment 1. A non-transitory machine readable medium including computer executable instructions, which when executed by a processor of a base station (102) (e.g., CBSD which is required to comply with SAS power control commands), control the base station to perform the steps of: receiving (612) a power down message (e.g., message from an SAS or other base station power management device that the base station must stop downlink transmissions in a frequency band being used by the base station); and reducing overall power used for downlink transmissions during downlink transmission time intervals (DL slots), in response to the power down message, in a series of incremental downlink power reduction steps Various embodiments are directed to apparatus, e.g., base stations, e.g. CBSDs, cable modems (CMs), cable modem termination systems (CMTS), base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a base station, e.g. a CBSD, a cable modems (CM), a cable modem termination system (CMTS), a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, SAS, an AFC system, cable networks, cloud networks, nodes, servers, cloud service servers, customer premises equipment devices, controllers, network monitoring nodes and/or servers and/or cable or network equipment devices. Various embodiments are directed to communications network which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

While the invention has been described in the context of a cable delivery system which uses a DOCSIS modem and coaxial cable in some embodiments, the methods and apparatus can be used in the context of other cable and modem combinations. In fact, the methods and apparatus can be used with a fiber optic cable and optical modem and/or with other types of cables and modems. Thus it should be appreciated that a base station can use the described methods with a wide range of cable and modem combinations.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a base station, e.g. CBSD, a cable modems (CM), a cable modem termination system (CMTS), a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, SAS, a AFC system, etc., said device including a processor configured to implement one, multiple or all of the steps of one or more methods of the invention.

In some embodiments, the processor or processors, e.g., CPUs, of one or more devices, e.g., a base station, e.g. a CBSD, a cable modems (CM), cable modem termination system (CMTS), a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a SAS, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a base station, e.g. a CBSD, a cable modem (CM), a cable modem termination system (CMTS), a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as e.g., e.g., a base station, e.g. CBSD, a cable modem (CM), a cable modem termination systems (CMT), a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a base station, e.g. CBSD, a cable modem (CM), a cable modem termination system (CMTS), a base station supporting massive MIMO such as a CBSD supporting massive MIMO, a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, security device, a AFC system, MNVO base station, e.g., a CBSD, an MNO cellular base station, e.g., an eNB or a gNB, a HSS server, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a base station, the method comprising:
   receiving a power down message;
   determining, based on predetermined stored information, a number of power reduction steps to be used in reducing overall power used for downlink transmissions during downlink transmission time intervals to reach zero power in downlink slots; and
   reducing overall power used for downlink transmissions during downlink transmission time intervals, in response to the power down message, in a series of incremental downlink power reduction steps.

2. The method of claim 1, wherein the incremental downlink power reduction steps are power reduction steps of a predetermined power reduction step size.

3. The method of claim 1, further comprising:
   sending a notification of a switch to a no downlink slot timing structure indicating that there will be no downlink slots following the switch to no downlink slot timing structure until such time that the base station sends an indication that downlink slots are supported.

4. The method of claim 1, wherein reducing overall power used for downlink transmissions during downlink transmission time intervals, in response to the power down message, in a series of incremental downlink power reduction steps includes:
reducing the overall amount of power used during a first time period for downlink transmission by: i) allowing some downlink slots to go unused during said first time period, ii) reducing the transmission power level used in some downlink slots or iii) by both allowing some downlink slots to go unused during said first time period and reducing the transmission power level used in some downlink slots.

5. The method of claim 4, further comprising:
selecting, one or more downlink slots to go unused during said first time period.

6. The method of claim 5, further comprising:
transmitting information indicating a decrease in overall downlink transmission power being used by the base station.

7. The method of claim 6, further comprising:
transmitting information indicating a timing structure change indicating an increase in the relative number of uplink slots to downlink slots.

8. The method of claim 5, further comprising:
sending a switch to no downlink slot timing notification signal indicating that slots following an uplink only notification signal will be uplink slots until a time that the base station sends an indication that downlink slots are supported, said switch to no downlink slot timing notification notifying User Equipments (UEs) that a switch in base station operation is being made to a mode in which zero transmission power is allocated to downlink transmission.

9. A method of operating a base station, the method comprising:
receiving a power down message;
determining a number of downlink power reduction steps to be used in performing a downlink power down procedure in response to the power down message;
reducing overall power used for downlink transmissions during downlink transmission time intervals, in response to the power down message, in a series of incremental downlink power reduction steps;
using a power reduction step counter to determine when the last of the determined number of downlink power reduction steps is being performed; and
switching to using a different timing structure in response to determining that the last of the determined number of downlink power reduction steps is being performed.

10. The method of claim 9, wherein the incremental downlink power reduction steps are power reduction steps of a predetermined power reduction step size.

11. A base station, the base station comprising:
a receiver;
a transmitter; and
a processor configured to control the base station to:
receive a power down message;
determine, based on predetermined stored information, a number of power reduction steps to be used in reducing overall power used for downlink transmissions during downlink transmission time intervals to reach zero power in downlink slots; and
reduce overall power used for downlink transmissions during downlink transmission time intervals, in response to the power down message, in a series of incremental downlink power reduction steps.

12. The base station of claim 11, wherein the incremental downlink power reduction steps are power reduction steps of a predetermined power reduction step size.

13. The base station of claim 11, wherein the processor is further configured to control the base station to:
send a notification of a switch to a no downlink slot timing structure indicating that there will be no downlink slots following the switch to no downlink slot timing structure until such time the base station sends an indication that downlink slots are supported.

14. The base station of claim 11, wherein the processor is further configured, as part of being configured to control the base station to reduce overall power used for downlink transmissions during downlink transmission time intervals, in response to the power down message, in a series of incremental downlink power reduction steps to control the base station to:
reduce the overall amount of power used during a first time period for downlink transmission by: i) allowing some downlink slots to go unused during said first time period, ii) reducing the transmission power level used in some downlink slots or iii) by both allowing some downlink slots to go unused during said first time period and reducing the transmission power level used in some downlink slots.

15. The base station of claim 14, wherein the processor is further configured to control the base station to:
select one or more downlink slots to go unused during said first time period.

16. The base station of claim 15, wherein the processor is further configured to control the base station to:
transmit information indicating a decrease in overall downlink transmission power being used by the base station.

17. The base station of claim 16, wherein the processor is further configured to control the base station to:
transmit information indicating a timing structure change indicating an increase in the relative number of uplink slots to downlink slots.

18. A base station, the base station comprising:
a receiver;
a transmitter; and
a processor configured to control the base station to:
receive a power down message;
determine a number of downlink power reduction steps to be used in performing a downlink power down procedure in response to the power down message;
use a power reduction step counter to determine when the last of the determined number of downlink power reduction steps is being performed; and
switch to using a different timing structure in response to determining that the last of the determined number of downlink power reduction steps is being performed.

19. The base station of claim 18, wherein the downlink power reduction steps are power reduction steps of a predetermined power reduction step size.

20. A non-transitory machine readable medium including computer executable instructions, which when executed by a processor of a base station, control the base station to perform the steps of:
receiving a power down message;
determining, based on predetermined stored information, a number of power reduction steps to be used in reducing overall power used for downlink transmissions during downlink transmission time intervals to reach zero power in downlink slots; and reducing overall power used for downlink transmissions during downlink transmission time intervals, in response to the power down message, in a series of incremental downlink power reduction steps.

\* \* \* \* \*